(12) United States Patent
Gao

(10) Patent No.: US 11,624,898 B2
(45) Date of Patent: Apr. 11, 2023

(54) LAMP WITH ZOOM LENS AND ZOOM LENS

(71) Applicant: APUTURE IMAGING INDUSTRIES CO., LTD., Guangdong (CN)

(72) Inventor: Chao Gao, Guangdong (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 234 days.

(21) Appl. No.: 17/120,254

(22) Filed: Dec. 13, 2020

(65) Prior Publication Data

US 2022/0146802 A1 May 12, 2022

(30) Foreign Application Priority Data

Nov. 6, 2020 (CN) .......................... 202011227803.2

(51) Int. Cl.
*G02B 15/14* (2006.01)
*G02B 7/04* (2021.01)

(52) U.S. Cl.
CPC ........... *G02B 15/1441* (2019.08); *G02B 7/04* (2013.01); *G02B 15/144111* (2019.08); *G02B 15/14* (2013.01)

(58) Field of Classification Search
USPC ................. 359/676–688, 694–706, 822–826
See application file for complete search history.

(56) References Cited

U.S. PATENT DOCUMENTS

| | | | |
|---|---|---|---|
| 2011/0228537 A1* | 9/2011 | Yoshimizu | ......... G02B 27/0955 362/268 |
| 2012/0262801 A1* | 10/2012 | Nakamura | ..... G02B 15/144113 359/687 |
| 2015/0160444 A1* | 6/2015 | Koizumi | ................ G02B 15/17 359/688 |
| 2017/0284637 A1* | 10/2017 | Rehn | ................... G02B 19/0028 |
| 2018/0149951 A1* | 5/2018 | Masui | ....................... G02B 9/62 |
| 2021/0113063 A1* | 4/2021 | Obikane | ......... G02B 15/145113 |

* cited by examiner

*Primary Examiner* — Mahidere S Sahle

(57) ABSTRACT

The invention discloses a lamp with a zoom lens, which comprises the zoom lens and a lamp body, the lamp body is connected with the zoom lens, the zoom lens comprises: a rear fixed group, comprising a first biconvex lens; a zooming group, comprising a first concave-convex meniscus lens and a plano-convex lens; a compensating group, comprising a biconcave meniscus lens and a second concave-convex meniscus lens; and a front fixed group, comprising a second biconvex lens. The four groups are sequentially arranged in the direction of an optical axis; and the lamp realizes zooming by movement of the zooming group and the compensating group in the direction of the optical axis. A change of a pattern or a beam size is realized; the number of lenses is reduced; zooming of the zoom lens is realized only by movement of the zooming group and the compensating group.

12 Claims, 16 Drawing Sheets

LAMP WITH ZOOM LENS AND ZOOM LENS

CROSS REFERENCE TO RELATED APPLICATIONS

The present application claims the benefit of Chinese Patent Application No. 202011227803.2 filed on Nov. 6, 2020. All the above are hereby incorporated by reference in their entirety.

FIELD OF THE INVENTION

The present invention relates to the technical field of optics, and particularly relates to a lamp with a zoom lens and a zoom lens.

BACKGROUND OF THE INVENTION

Currently, lenses adopted by lamps applied to stage lighting and photographic camera shooting special effect lighting are divided into two types: a prime lens and a zoom lens, wherein the prime lens can only implement image projection at a fixed angle and thus has a certain limitation, but the zoom lens can just solve this problem well and can realize different times of zooming, and based on this, demands for the zoom lens in the market are increasingly strong.

However, it can be found by practice that the zoom lens frequently needs to be formed by a dozen of lenses, resulting in high cost, and if the zoom lens uses a small number of lenses, resulting in reduction of image quality. It is thus clear that it is particularly important to design a zoom lens which can reduce cost while providing high image quality.

SUMMARY OF INVENTION

The technical problem to be solved by the present invention is to provide a lamp with a zoom lens and a zoom lens, so that the cost of the zoom lens can be reduced while high image quality is provided.

In order to solve the above technical problem, the present invention discloses a lamp with a zoom lens in a first aspect. The lamp comprises the zoom lens and a lamp body, the lamp body is connected with the zoom lens, and the zoom lens comprises:

a rear fixed group, the rear fixed group comprising a first biconvex lens;

a zooming group, the zooming group comprising a first concave-convex meniscus lens and a plano-convex lens;

a compensating group, the compensating group comprising a biconcave meniscus lens and a second concave-convex meniscus lens; and a front fixed group, the front fixed group comprising a second biconvex lens, wherein the rear fixed group, the zooming group, the compensating group and the front fixed group are sequentially arranged in the direction of an optical axis from a light source surface to a projection surface; and the lamp realizes zooming by movement of the zooming group and the compensating group included in the zoom lens in the direction of the optical axis.

As an optional embodiment, in the first aspect of the present invention, the zooming group further comprises a third concave-convex meniscus lens, and the third concave-convex meniscus lens is positioned between the first biconvex lens and the first concave-convex meniscus lens; and the first concave-convex meniscus lens is glued or attached to the plano-convex lens.

As an optional embodiment, in the first aspect of the present invention, focal lengths of the rear fixed group, the zooming group, the compensating group and the front fixed group are a positive focal length, a positive focal length, a negative focal length and a positive focal length, respectively.

As an optional embodiment, in the first aspect of the present invention, a distance range of the rear fixed group and the zooming group on the optical axis is 26 to 90 mm, a distance range of the zooming group and the compensating group on the optical axis is 4.6 to 83 mm, and a distance range of the compensating group and the front fixed group on the optical axis is 2.8 to 15 mm.

As an optional embodiment, in the first aspect of the present invention, a total mechanism length of the zoom lens is L, and a value range of L is that: L is smaller than 4f and greater than 3f;

a focal length of the rear fixed group is $f_1$, and a value range of $f_1$ is that: $f_1$ is smaller than 2.5f and greater than 1.5f;

a focal length of the zooming group is $f_2$, and a value range of $f_2$ is that: $f_2$ is smaller than 2f and greater than f;

a focal length of the compensating group is $f_3$, and a value range of $f_3$ is that: $f_3$ is smaller than $-0.5f$ and greater than $-f$; and a focal length of the front fixed group is $f_4$, and a value range of $f_4$ is that: $f_4$ is smaller than 2f and greater than f, wherein f is a short-focus focal length of the zoom lens.

As an optional embodiment, in the first aspect of the present invention, a focal length of the biconcave meniscus lens is $f_{31}$, and a value range of $f_{31}$ is that: $f_{31}$ is smaller than $-1.1f$ and greater than $-1.3f$;

a focal length of the second concave-convex meniscus lens is $f_{32}$, a value range of $f_{32}$ is that: $f_{32}$ is smaller than $-2.3f$ and greater than $-2.5f$, and a concave surface of the second concave-convex meniscus lens faces a pattern or the light source surface; and the biconcave meniscus lens or the second concave-convex meniscus lens is made of a negative lens material, a refractive index nd of the negative lens material is smaller than 1.65, and a dispersion coefficient vd of the negative lens material is greater than 50, wherein f is the short-focus focal length of the zoom lens.

As an optional embodiment, in the first aspect of the present invention, the refractive index nd of a lens material of the second biconvex lens is greater than 1.7, and the dispersion coefficient vd of the second biconvex lens is smaller than 30.

As an optional embodiment, in the first aspect of the present invention, the lamp further comprises a shell and a dimming attachment structure, the dimming attachment structure being arranged between the lamp body and the zoom lens, and the lamp body comprising: a light source, a first collimating lens and a second collimating lens, wherein the light source, the first collimating lens, the second collimating lens, the dimming attachment structure and the zoom lens are sequentially arranged in the shell in the light emergent direction of the lamp.

As an optional embodiment, in the first aspect of the present invention, the first collimating lens moves along with the light source, and the second collimating lens is a fixed lens;

the lamp carries out focusing by front-and-back movement of the first collimating lens; the lamp regulates frontand-back movement of the zooming group and the compensating group by rotating a lens barrel corresponding to the zoom lens so as to regulate the size of a light spot; and the lamp regulates blur and definition of a projection light spot by overall front-and-back movement of the zoom lens.

As an optional embodiment, in the first aspect of the present invention, lens parameters of the first collimating lens and/or the second collimating lens are set according to the size of a light-emitting surface of the light source;

the lens parameters comprise one or a combination of two or more of a movement stroke, a minimum distance between the lenses, a diameter, a thickness, an arc surface diameter, an edge thickness, a convex surface texture type, a plane texture type, a surface roughness of a convex surface, a surface roughness of a plane, a refractive index, an effective focal length and a material.

As an optional embodiment, in the first aspect of the present invention, a distance range of the first collimating lens and the second collimating lens on the optical axis is 2.5 to 37.5 mm, and a distance range of the second collimating lens and the rear fixed group on the optical axis is 140 to 177.5 mm; and a convex surface, away from the light source, of the first collimating lens has an orange peel pattern, and a plane, facing the light source of the second collimating lens has an orange peel pattern.

In a second aspect, the present invention discloses a zoom lens, comprising:

a rear fixed group, the rear fixed group comprising a first biconvex lens;

a zooming group, the zooming group comprising a first concave-convex meniscus lens and a plano-convex lens;

a compensating group, the compensating group comprising a biconcave meniscus lens and a second concave-convex meniscus lens; and a front fixed group, the front fixed group comprising a second biconvex lens, wherein the rear fixed group, the zooming group, the compensating group and the front fixed group are sequentially arranged in the direction of an optical axis from a light source surface to a projection surface; and the zoom lens realizes zooming by movement of the zooming group and the compensating group in the direction of the optical axis.

Compared to the prior art, the embodiments of the present invention have the following beneficial effects that:

the lamp with the zoom lens, which is provided by the embodiments of the present invention, can realize a change of a pattern or a beam size in the photographic camera shooting and special effect lighting process, and the number of lenses for forming the zoom lens is effectively reduced so as to benefit for improving convenience and efficiency of assembling the zoom lens; and zooming of the zoom lens can be realized only by movement of the zooming group and the compensating group, so that convenience and efficiency of zooming control of the zoom lens are improved, and the cost of the zoom lens can also be reduced, thereby reducing the cost of the lamp.

BRIEF DESCRIPTION OF THE DRAWINGS

In order to illustrate the technical solutions in the embodiments of the present invention more clearly, accompanying drawings used in the description of the embodiments will be briefly introduced below. Obviously, the accompanying drawings in the following description are just some embodiments of the present invention. For those of ordinary skill in the art, other accompanying drawings can be obtained according to structures shown in the accompanying drawings without creative work.

DETAILED DESCRIPTION OF THE ILLUSTRATED EMBODIMENTS

In order to make those skilled in the art understand the solutions of the present invention better, the technical solutions in the embodiments of the present invention will be clearly and completely described below in combination with the accompanying drawings in the embodiments of the present invention. Obviously, the described embodiments are only a part of the embodiments of the present invention, but not all of the embodiments. Based on the embodiments of the present invention, all other embodiments obtained by those of ordinary skill in the art without creative efforts shall fall within the scope of the present invention.

Directional terms mentioned in the present invention, such as up, down, left, right, front, back, inside, outside, side and the like, merely refer to directions of additional schemas. Therefore, the used directional terms are only used to illustrate and understand the present invention, but not intended to limit the present invention. Words such as "first", "second" and the like are only used for description, but should not be understood as denotation or suggestion on relative importance or implication on the number of indicated technical features. Therefore, features defined with "first", "second" and the like can expressly or implicitly comprise one or more features.

"Embodiments" mentioned herein means that specific features, structures or characteristics described in combination with the embodiments can be included in at least one embodiment of the present invention. This phrase which appears at each position in the description does not necessarily refer to the same embodiment, and also does not refer to an independent or alternative embodiment mutually exclusive with other embodiments. Those skilled in the art should expressly or implicitly understand that the embodiments described herein can be combined with other embodiments.

The present invention discloses a lamp with a zoom lens and a zoom lens. The lamp and the zoom lens can realize a change of a pattern or a beam size in the photographic camera shooting and special effect lighting process, and the number of lenses for forming the zoom lens is effectively reduced so as to benefit for improving convenience and efficiency of assembling the zoom lens; and zoom of the zoom lens can be realized only by movement of the zooming group and the compensating group, so that convenience and efficiency of zoom control of the zoom lens are improved, and cost of the zoom lens can also be reduced, thereby reducing cost of the lamp. It will be respectively illustrated in detail below.

Embodiment I

Figure 1:
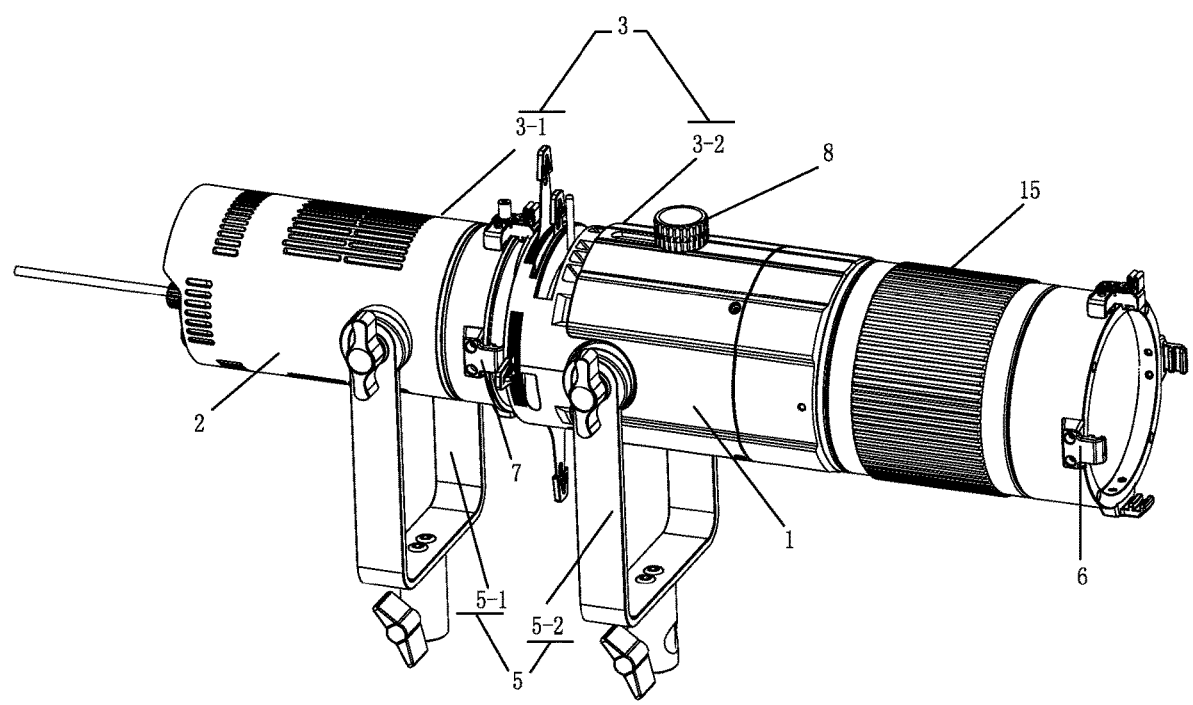
FIG. 1 is a three-dimensional structural schematic diagram of a lamp with a zoom lens, as disclosed by an embodiment of the present invention.

With reference to FIG. 1, FIG. 1 is a three-dimensional structural schematic diagram of a lamp with a zoom lens, as disclosed by an embodiment of the present invention. As shown in FIG. 1, the lamp with the zoom lens comprises:

the zoom lens 1 and a lamp body 2, wherein the lamp body 2 is connected with the zoom lens 1. Optionally, the lamp further comprises a shell 3 (which can also be referred to as a lens barrel), and specific parts included in the lamp body 2 and specific parts included in the zoom lens 1 are sequentially arranged in the shell 3 in a light emergent direction. Specifically, the shell 3 can comprise a first shell 3-1 and a second shell 3-2, the specific parts included in the lamp body 2 are arranged in the first shell 3-1, and the specific parts included in the zoom lens 1 are arranged in the second shell 3-2. It should be noted that in other embodiments, the first shell 3-1 can be used as a component part of the lamp body 2, and the second shell 3-2 can be used as a component part of the zoom lens 1.

Figure 2:
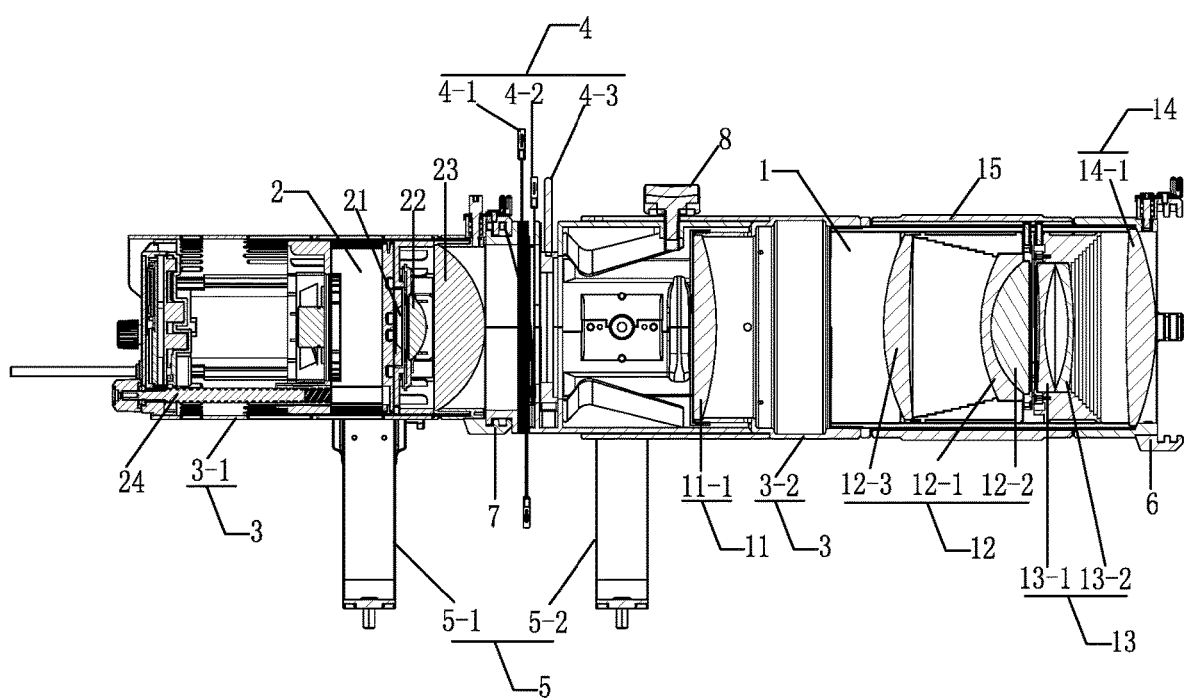
FIG. 2 is a sectional structural schematic diagram of a lamp with a zoom lens, as disclosed by an embodiment of the present invention.

Optionally, as shown in FIG. 2, the zoom lens 1 comprises:

a rear fixed group 11, the rear fixed group 11 comprising a first biconvex lens 11-1;

a zooming group 12, the zooming group 12 comprising a first concave-convex meniscus lens 12-1 and a plano-convex lens 12-2;

a compensating group 13, the compensating group 13 comprising a biconcave meniscus lens 13-1 and a second concave-convex meniscus lens 13-2; and a front fixed group 14, the front fixed group 14 comprising a second biconvex lens 14-1.

Wherein, the rear fixed group 11, the zooming group 12, the compensating group 13 and the front fixed group 14 are sequentially arranged in the direction of an optical axis from a light source surface to a projection surface (i.e., the light emergent direction of the lamp), and lenses included in each group are all spherical lenses. The lamp realizes zooming by front-and-back movement of the zooming group 12 and the compensating group 13 included in the zoom lens 1 in the direction of the optical axis, i.e., the rear fixed group 11 and the front fixed group 14 are relatively fixed, or the distance between the rear fixed group 11 and the front fixed group 14 is kept unchanged, the zooming group 12 and the compensating group 13 are movable, and specifically, different group combined focal lengths are achieved by moving the lenses included in the zooming group 12 and the compensating group 13 so as to realize zooming of the zoom lens 1 to project patterns or light spots of different sizes.

It should be understood that curvatures of both the first concave-convex meniscus lens 12-1 and the plano-convex lens 12-2 are greater than curvatures of the first biconvex lens 11-1, the second biconvex lens 14-1, the biconcave meniscus lens 13-1 and the second concave-convex meniscus lens 13-2.

Optionally, as shown in FIG. 2, the zooming group 12 further comprises a third concave-convex meniscus lens 12-3, and the third concave-convex meniscus lens 12-3 is positioned between the first biconvex lens 11-1 and the first concave-convex meniscus lens 12-1, wherein the diameter of the third concave-convex meniscus lens 12-3 is larger than the diameters of the first concave-convex meniscus lens 12-1 and the plano-convex lens 12-2, and the curvature of the third concave-convex meniscus lens 12-3 is much smaller than the curvatures of the first concave-convex meniscus lens 12-1 and the plano-convex lens 12-2. If only the first concave-convex meniscus lens 12-1 and the plano-convex lens 12-2 are used, requirements on parameters of respective lenses are higher, e.g., the curvatures of the first concave-convex meniscus lens 12-1 and the plano-convex lens 12-2 are larger than the curvatures of other lenses, so the corresponding manufacturing difficulty and cost are also higher. In this case, the zooming group 12 can further comprise three lenses, i.e., the zoom lens 1 comprises seven lenses, wherein adding the third concave-convex meniscus lens 12-3 to the zooming group 12 can take a compensating effect and can effectively reduce diameter sizes and curvatures of the first concave-convex meniscus lens 12-1, the plano-convex lens 12-2 and other lenses positioned behind the first concave-convex meniscus lens 12-1 and the plano-convex lens 12-2 in the direction of the optical axis, and with respect to direct production and use of the first concave-convex meniscus lens 12-1 and the plano-convex lens 12-2 which have large diameters and large curvatures, adding one third concave-convex meniscus lens 12-3 with a big diameter and a small curvature can greatly reduce the machining difficulty and production cost of the corresponding lenses.

Optionally, the first concave-convex meniscus lens 12-1 is glued or attached to the plano-convex lens 12-2, and specifically, the first concave-convex meniscus lens 12-1 and the plano-convex lens 12-2 can be glued by using optical resin gum, and further preferably, a glued layer is required to have no impurities or bubbles.

Optionally, focal lengths of the rear fixed group 11, the zooming group 12, the compensating group 13 and the front fixed group 14 are a positive focal length, a positive focal length, a negative focal length and a positive focal length, respectively.

Optionally, a ratio range of the zoom lens 1 is 1.5 times to 2.5 times, and more than two times of zooming is realized. A total mechanism length of the zoom lens 1 is L, and a value range of L is that: L is smaller than 4f and greater than 3f; a focal length of the rear fixed group 11 is $f_1$, and a value range of $f_1$ is that: $f_1$ is smaller than 2.5f and greater than 1.5f; a focal length of the zooming group 12 is $f_2$, and a value range of $f_2$ is that: $f_2$ is smaller than 2f and greater than f; a focal length of the front fixed group 14 is $f_4$, and a value range of $f_4$ is that: $f_4$ is smaller than 2f and greater than f; and a focal length of the compensating group 13 is $f_3$, and a value range of $f_3$ is that: $f_3$ is smaller than −0.5f and greater than −f, wherein f is a short-focus focal length of the zoom lens (1).

Optionally, the zoom lens 1 has no fixed diaphragm surface. Additional diaphragms, e.g., aperture diaphragms and the like, are not arranged among the rear fixed group 11, the zooming group 12, the compensating group 13 and the front fixed group 14, so that in a full zooming range of the entire zoom lens 1, an object space numerical aperture is unchanged.

Optionally, in the full zooming range of the zoom lens 1, a total optical length of the zoom lens 1 can be 360 mm, the moving length of the entire zoom lens 1 relative to the lamp body 2 can be 37.5 mm, and the object space numerical aperture of the zoom lens 1 is greater than 0.2.

Optionally, a distance range of the rear fixed group 11 and the zooming group 12 on the optical axis is 26 to 90 mm, a distance range of the zooming group 12 and the compensating group 13 on the optical axis is 4.6 to 83 mm, and a distance range of the compensating group 13 and the front fixed group 14 on the optical axis is 2.8 to 15 mm.

Optionally, a focal length of the biconcave meniscus lens 13-1 is $f_{31}$, and a value range of $f_{31}$ is that: $f_{31}$ is smaller than −1.1f and greater than −1.3f; a focal length of the second concave-convex meniscus lens 13-2 is $f_{32}$, a value range of $f_{32}$ is that: $f_{32}$ is smaller than −2.3f and greater than −2.5f, f is a short-focus focal length of the zoom lens 1, and a concave surface of the second concave-convex meniscus lens 13-2 faces a pattern or the light source surface; and the biconcave meniscus lens 13-1 or the second concave-convex meniscus lens 13-2 is made of a negative lens material, a refractive index nd of the negative lens material is smaller than 1.65, and a dispersion coefficient vd of the negative lens material is greater than 50.

Optionally, a refractive index nd of a lens material of the second biconvex lens 14-1 is greater than 1.7, and a dispersion coefficient vd of the second biconvex lens 14-1 is smaller than 30.

Optionally, as shown in FIG. 2, the lamp body 2 comprises: a light source 21, a first collimating lens 22 and a second collimating lens 23, optionally, the lamp can further comprise a dimming attachment structure 4, the dimming attachment structure 4 can be arranged between the lamp body 2 and the zoom lens 1, and specifically, the dimming attachment structure 4 can be arranged between the second collimating lens 23 and the first biconvex lens 11-1. Further optionally, the dimming attachment structure 4 can comprise any one or a combination of two or more of a shutter 4-1, a gobo 4-2 and a diaphragm 4-3, so that light control modeling of the lamp can be enriched. The light source 21 can be an LED light source, and the light source 21 can be a mixed light source with at least two colors, e.g., a mixed light source formed by combining two or more of a red light source, a green light source, a blue light source and the like, the specific number of light sources can be set according to actual demands, and it should be noted that light sources with other colors, such as colors of cold white, warm white, amber, lemon and the like, or other types of light sources, such as an organic LED and the like, are all feasible, and the embodiments of the present invention do not make any limit, wherein the light source 21, the first collimating lens 22, the second collimating lens 23, the shutter 4-1, the gobo 4-2, the diaphragm 4-3 and the zoom lens 1 are sequentially arranged in the shell 3 in the light emergent direction, i.e., parts in the light emergent direction are the light source 21, the first collimating lens 22, the second collimating lens 23, the shutter 4-1, the gobo 4-2, the diaphragm 4-3, the rear fixed group 11, the zooming group 12, the compensating group 13 and the front fixed group 14 in sequence. It should be noted that in other optional embodiments, the dimming attachment structure 4 can be used as a component part of the zoom lens 1.

Optionally, as shown in FIG. 2, the lamp further comprises a supporting structure 5, and the supporting structure 5 is used for supporting the shell 3. Weights of the lamp body 2 and the zoom lens 1 are relatively heavy, one single supporting frame cannot stably support the entire lamp and one single supporting frame is liable to influence the stability of optical imaging, and thus, further optionally, the supporting structure 5 comprises a first supporting structure 5-1 and a second supporting structure 5-2, wherein the first supporting structure 5-1 is mounted on the first shell 3-1 to support the first shell 3-1, and the second supporting structure 5-2 is mounted on the second shell 3-2 to support the second shell 3-2, so that the entire lamp can be stably supported and the stability of optical imaging can also be improved, wherein both the first supporting structure 5-1 and the second supporting structure 5-2 can be brackets, e.g., U-shaped brackets and the like, wherein the supporting structure 5 included in the lamp can also be combined with an external mounting frame to mount the lamp at a needed position, and a specific structure of the supporting structure 5 can be regulated along with the external mounting frame. Further, the first supporting structure 5-1 and the second supporting structure 5-2 can be in parallel mutually, so that the first shell 3-1 and the second shell 3-2 can be more stably fixed, thereby benefiting for enabling light emitted by the lamp body 2 and light reaching the zoom lens 1 to be positioned on the same optical axis.

Optionally, as shown in FIG. 2, the lamp further comprises a second clamping structure 6, the second clamping structure 6 is arranged at the tail of the shell 3 in the light emergent direction, and specifically, the second clamping structure 6 is arranged at the tail of the second shell 3-2 in the light emergent direction so as to facilitate carrying out assembling and disassembling on the lamp and other parts or other structures which for example can be a light diffusing part such as a diffuser and the like. Further optionally, there can be a plurality of second clamping structures 6 and the second clamping structures can be circumferentially arranged at the tail of the second shell 3-2 in the light emergent direction, so as to benefit for improving the stability of clamping between the lamp and other parts or other structures.

Optionally, as shown FIG. 2, the lamp further comprises a first clamping structure 7, there can be a plurality of first clamping structures 7, the plurality of first clamping structures 7 are circumferentially arranged along the tail of the first shell 3-1 in the light emergent direction, for example, three or four first clamping structures 7 and the like are arranged in the circumferential direction of the first shell 3-1, and the lamp body 2 can be connected with the zoom lens 1 by the first clamping structures 7. Further optionally, the first clamping structure 7 can be a claw. It should be noted that if the first shell 3-1 is used as a component part of the lamp body 2 and the second shell 3-2 is used as a component part of the zoom lens 1, connection between the lamp body 2 and the zoom lens 1 by the first clamping structure 7 specifically is that the first shell 3-1 is clamped with the second shell 3-2 by the first clamping structure 7, wherein arrangement of the first clamping structure 7 can facilitate disassembling and assembling of the lamp body 2 and the zoom lens 1 and enhance the flexibility of the lamp, and the arranged plurality of first clamping structures 7 are beneficial for improving the stability of clamping between the lamp body 2 and the zoom lens 1.

In the embodiments of the present invention, it can known from the description above that the zoom lens 1 can comprise six lenses, or can comprise seven lenses, and by taking a case that the zoom lens 1 comprises seven lenses as an example, the light source surface and each lens surface of seven lenses are numbered in the light emergent direction to obtain surface serial numbers of S0 to S14, and for more specific parameters of each surface (the light source surface S0 and the lens surfaces S1 to S14 of the lens), please refer to the following table (Table 1):

TABLE 1

| Surface Serial Number | Curvature Radius (mm) | Thickness (mm) | Material | Semi-diameter (mm) |
|---|---|---|---|---|
| S0 | Infinity | 100.000 | \ | 24.000 |
| S1 | 2514.000 | 12.000 | H-F51 | 47.000 |
| S2 | −150.000 | 90.000(MAX)/ 16.000(MIN) | \ | 47.000 |
| S3 | 107.000 | 13.000 | D-ZPK1A | 47.000 |
| S4 | 610.000 | 36.000 | \ | 47.000 |
| S5 | 79.000 | 5.000 | H-LAK53A | 38.000 |
| S6 | 42.000 | 0.000 | \ | 34.000 |
| S7 | 42.000 | 19.300 | H-FK61 | 34.000 |
| S8 | Infinity | 4.6.000(MIN)/ 83.000(MAX) | \ | 34.000 |
| S9 | −436.000 | 2.800 | H-LAK53A | 33.000 |
| S10 | 96.000 | 11.700 | \ | 33.000 |
| S11 | −80.000 | 2.800 | H-ZK10 | 33.000 |
| S12 | −200.000 | 28.000(MAX)/ 12.000(MIN) | \ | 33.000 |
| S13 | 767.000 | 15.000 | ZF6 | 50.000 |
| S14 | −131.000 | 0.000 | \ | 50.000 |

Optionally, the light source 21, the first collimating lens 22 and the second collimating lens 23 are arranged in the first shell 3-1, the light source 21 can move along the optical axis in the first shell 3-1 by a focusing structure (e.g., a lead screw and the like), the second collimating lens 23 is a fixed lens, a diameter of the second collimating lens 23 is greater than that of the first collimating lens 22, the first collimating lens 22 is fixed on a light emergent side of the light source 21 and moves along with the light source 21 together, and the lamp carries out focusing by front-and-back movement of the first collimating lens 22 relative to the second collimating lens 23; the lamp regulates front-and-back movement of the zooming group 12 and the compensating group 13 by rotating a lens barrel (i.e., a CAM lens barrel) corresponding to the zoom lens 1 so as to regulate the size of the light spot; and the lamp regulates blur and definition of a projection light spot by overall front-and-back movement of the zoom lens 1.

In an optional embodiment, a distance range of the first collimating lens 22 and the second collimating lens 23 on the optical axis can be 2.5 to 37.5 mm, and a distance range of the second collimating lens 23 and the rear fixed group 11 on the optical axis can be 140 to 177.5 mm. The diameter of the first collimating lens 22 is 40 mm, the thickness of the first collimating lens 22 is 10 mm, the arc surface diameter of the first collimating lens 22 is 23.40 mm, the edge thickness of the first collimating lens 22 is 2.13 mm, a convex surface, away from the light source 21, of the first collimating lens 22 has an orange peel pattern, the surface roughness of a plane of the first collimating lens 22 is 0.006, the refractive index of the first collimating lens 22 is 1.47, the effective focal length of the first collimating lens 22 is 45 mm, and the material of the first collimating lens 22 can be borosilicate. The diameter of the second collimating lens 23 is 90 mm, the thickness of the second collimating lens 23 is 27.46 mm, the arc surface diameter of the second collimating lens 23 is 52.50 mm, the edge thickness of the second collimating lens 23 is 2 mm, a plane, facing the light source 21, of the second collimating lens 23 has an orange peel pattern, the surface roughness of a convex surface of the second collimating lens 23 is 0.006, the refractive index of the second collimating lens 23 is 1.47, the effective focal length of the second collimating lens 23 is 100 mm, and the material of the second collimating lens 23 can be borosilicate. By the above setting of the first collimating lens 22 and the second collimating lens 23, the light emitted by the light source 21 can be mixed and collimated better.

Certainly, optionally, lens parameters of the first collimating lens 22 and/or the second collimating lens 23 can also be set according to the size of a light-emitting surface (i.e., the light source surface) of the light source 21, and for example, when the light-emitting surface of the light source 21 becomes larger, the corresponding diameter, thickness and the like are increased, and when the light-emitting surface of the light source 21 becomes smaller, the corresponding diameter, thickness and the like are decreased. Further optionally, the lens parameters comprise one or a combination of two or more of the movement stroke, the minimum distance between the lenses, the diameter, the thickness, the arc surface diameter, the edge thickness, a convex surface texture type, a plane texture type, the surface roughness of the convex surface, the surface roughness of the plane, the refractive index, the effective focal length and the material.

Figure 11:
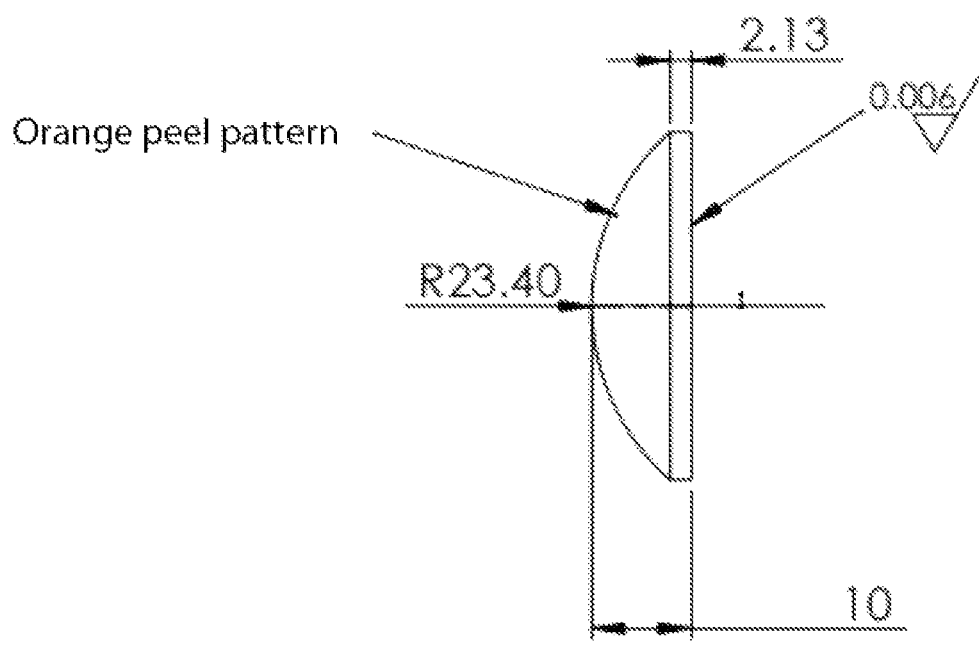
FIG. 11 is a structural schematic diagram of a first collimating lens disclosed by an embodiment of the present invention.
Figure 12:
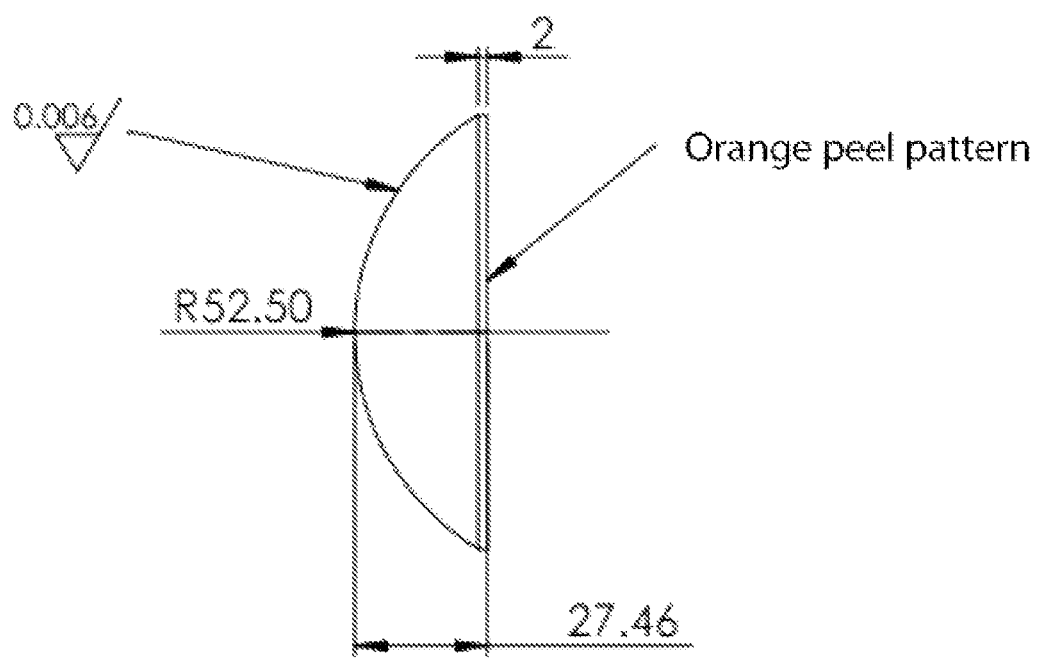
FIG. 12 is a structural schematic diagram of a second collimating lens disclosed by an embodiment of the present invention.

In some embodiments, the minimum distance between the first collimating lens 22 and the second collimating lens 23 is 2.5 mm, the run stroke of the first collimating lens 22 relative to the second collimating lens 23 is 35 mm, the minimum distance between the second collimating lens 23 and the zoom lens 1 is 140.65 mm, i.e., the minimum distance between the second collimating lens 23 and the rear fixed group 11 of the zoom lens 1 is 140.65 mm, and the movement stroke of the second collimating lens is 37.5 mm, wherein structures of the first collimating lens 22 and the second collimating lens 23 can respectively refer to a structural schematic diagram of a first collimating lens described in FIG. 11 and a structural schematic diagram of a second collimating lens described in FIG. 12.

In one optional embodiment, as shown in FIG. 2, the lamp body 2 further comprises a first regulating mechanism 24, the lamp further comprises a second regulating mechanism 8, and the zoom lens 1 further comprises a third regulating mechanism 15, wherein the first regulating mechanism 24 is connected with the light source 21, the first regulating mechanism 24 is used for regulating the distance between the light source 21 and the second collimating lens 23, and the first collimating lens 22 and the light source 21 are kept synchronously moving;

the second regulating mechanism 8 is connected with the zoom lens 1, and the second regulating mechanism 8 is used for regulating movement of the rear fixed group 11, the zooming group 12, the compensating group 13 and the front fixed group 14 as a whole relative to the second collimating lens 23, and certainly, can also be understood to be used for regulating the distance between the rear fixed group 11 and the second collimating lens 23; and the third regulating mechanism 15 is connected with the zooming group 12 and the compensating group 13, and the third regulating mechanism 15 is used for regulating the distance between the zooming group 12 and the compensating group 13.

It should be noted that in other optional embodiments, the second regulating mechanism 8 can also be used as a component part of the zoom lens 1, i.e., the zoom lens 1 can also comprise the second regulating mechanism 8.

It is thus clear that implementation on the lamp with the zoom lens, as described in FIG. 1 and FIG. 2, can realize a change of a pattern or a beam size in the photographic camera shooting and special effect lighting process, and the number of the lenses for forming the zoom lens is effectively reduced (i.e., not greater than 7) so as to benefit for improving convenience and efficiency of assembling the zoom lens; and zooming of the zoom lens can be realized only by movement of the zooming group and the compensating group, so that convenience and efficiency of zooming control of the zoom lens are improved, and the cost of the zoom lens can also be reduced, thereby reducing the cost of the lamp.

Embodiment II

Figure 3:
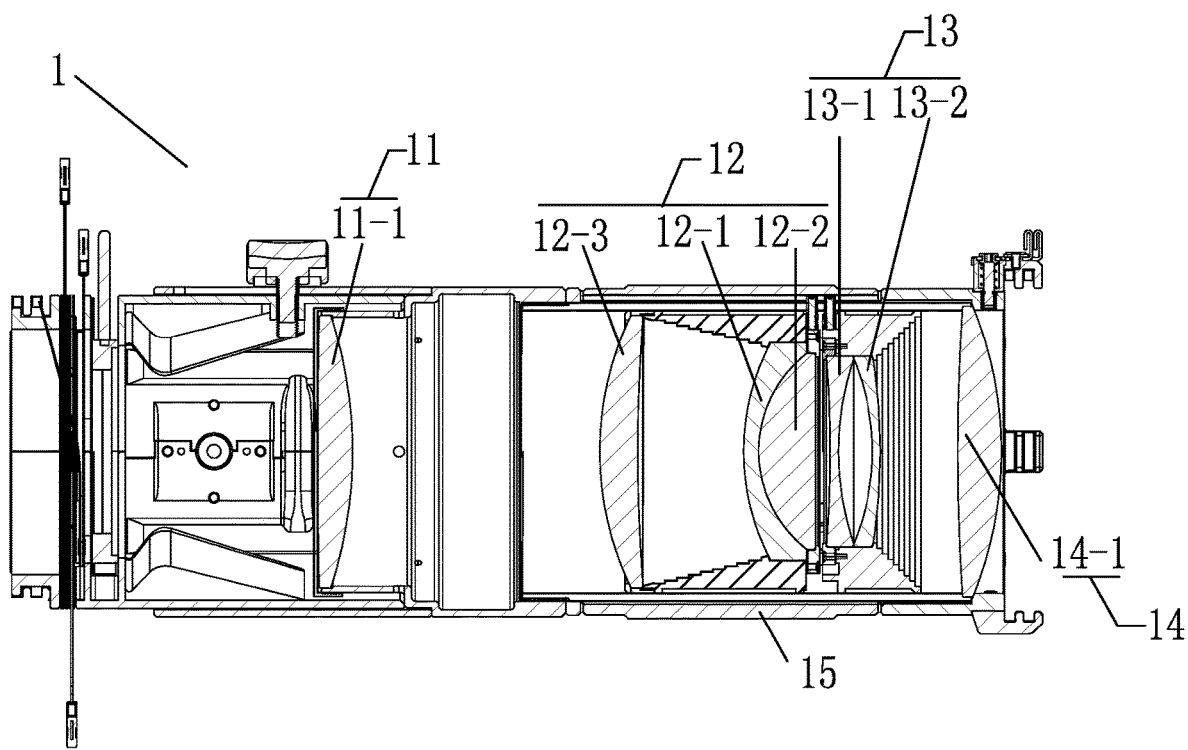
FIG. 3 is a structural schematic diagram of a zoom lens disclosed by an embodiment of the present invention.

With reference to FIG. 3, FIG. 3 is a structural schematic diagram of a zoom lens disclosed by an embodiment of the present invention, wherein the zoom lens described in FIG. 3 can be applied to a corresponding lighting lamp or photographic camera shooting lamp, and the embodiments of the present invention do not make any limit thereto. As shown in FIG. 3, the zoom lens 1 comprises:

a rear fixed group 11, the rear fixed group 11 comprising a first biconvex lens 11-1;

a zooming group 12, the zooming group 12 comprising a first concave-convex meniscus lens 12-1 and a plano-convex lens 12-2;

a compensating group 13, the compensating group 13 comprising a biconcave meniscus lens 13-1 and a second concave-convex meniscus lens 13-2; and a front fixed group 14, the front fixed group 14 comprising a second biconvex lens 14-1.

Wherein, the rear fixed group 11, the zooming group 12, the compensating group 13 and the front fixed group 14 are sequentially arranged in the direction of an optical axis from a light source surface to a projection surface (i.e., a light emergent direction of the lamp), and lenses included in each group are all spherical lenses. The lamp realizes zooming by front-and-back movement of the zooming group 12 and the compensating group 13 included in the zoom lens 1 in the direction of the optical axis, i.e., the rear fixed group 11 and the front fixed group 14 are relatively fixed, or the distance between the rear fixed group 11 and the front fixed group 14 is kept unchanged, the zooming group 12 and the compensating group 13 are movable, and specifically, different group combined focal lengths are achieved by moving the lenses included in the zooming group 12 and the compensating group 13 so as to realize zooming of the zoom lens 1 to project patterns or light spots of different sizes.

Figure 4:
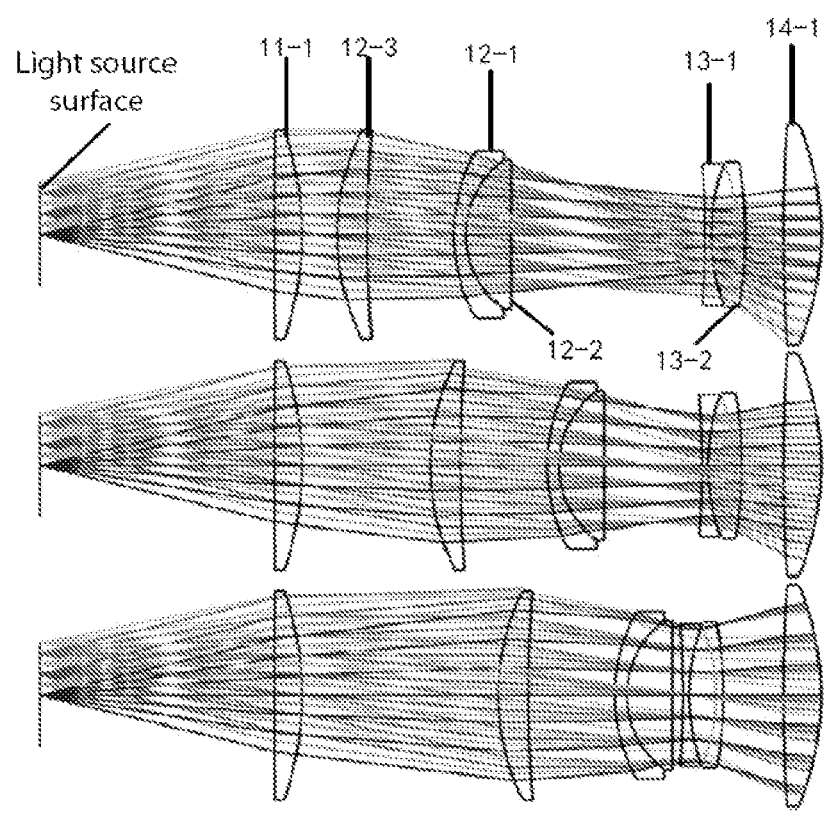
FIG. 4 is a schematic diagram of a lens movement change of a zoom lens disclosed by an embodiment of the present invention.

Wherein, movement of the lenses in the zooming group 12 and the compensating group 13 in the direction of the optical axis can be as shown in FIG. 4, and FIG. 4 is a schematic diagram of a lens movement change of a zoom lens disclosed by an embodiment of the present invention. As shown in FIG. 4, the lenses in the zooming group 12 and the compensating group 13 can move to achieve different group combined focal lengths so as to realize zooming of the zoom lens 1, wherein the closer the lenses included in the zooming group 12 are to the lenses included in the compensating group 13, the longer a focal length of the zoom lens 1 is.

Optionally, as shown in FIG. 3, the zooming group 12 further comprises a third concave-convex meniscus lens 12-3, and the third concave-convex meniscus lens 12-3 is positioned between the first biconvex lens 11-1 and the first concave-convex meniscus lens 12-1, wherein the diameter of the third concave-convex meniscus lens 12-3 is larger than the diameters of the first concave-convex meniscus lens 12-1 and the plano-convex lens 12-2, and the curvature of the third concave-convex meniscus lens 12-3 is much smaller than the curvatures of the first concave-convex meniscus lens 12-1 and the plano-convex lens 12-2. If only the first concave-convex meniscus lens 12-1 and the plano-convex lens 12-2 are used, requirements on parameters of respective lenses are higher, e.g., the curvatures of the first concave-convex meniscus lens 12-1 and the plano-convex lens 12-2 are larger than the curvatures of other lenses, so the corresponding manufacturing difficulty and cost are also higher. In this case, the zooming group 12 can further comprise three lenses, i.e., the zoom lens comprises seven lenses, wherein adding the third concave-convex meniscus lens 12-3 to the zooming group 12 can take a compensating effect and can effectively reduce diameter sizes and curvatures of the first concave-convex meniscus lens 12-1, the plano-convex lens 12-2 and other lenses positioned behind the first concave-convex meniscus lens 12-1 and the plano-convex lens 12-2 in the direction of the optical axis, and with respect to direct production and use of the first concave-convex meniscus lens 12-1 and the plano-convex lens 12-2 which have large diameters and large curvatures, adding one third concave-convex meniscus lens 12-3 with a big diameter and a small curvature can greatly reduce the machining difficulty and production cost of the corresponding lenses.

Optionally, as shown in FIG. 3, the zoom lens 1 further comprises a third regulating mechanism 15, the third regulating mechanism 15 is connected with the zooming group 12 and the compensating group 13, and the third regulating mechanism 15 is used for regulating the distance between the zooming group 12 and the compensating group 13.

It should be noted that other detailed descriptions on the zoom lens described in the embodiment of the present invention can refer to the corresponding descriptions on the zoom lens 1 in Embodiment I, and the embodiment of the present invention will not repeat.

Figure 5:
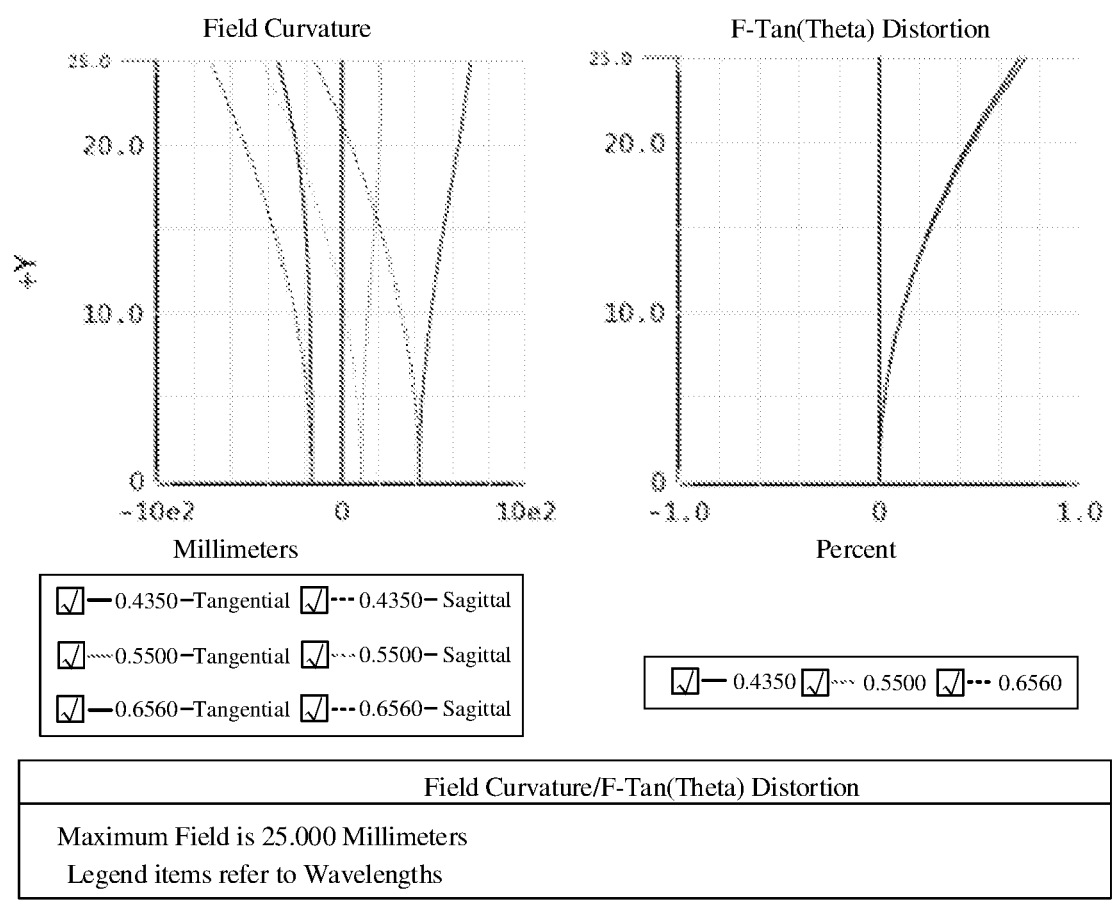
FIG. 5 is a curve chart of a field curvature/distortion under the longest focal length of a zoom lens, as disclosed by an embodiment of the present invention.
Figure 6:
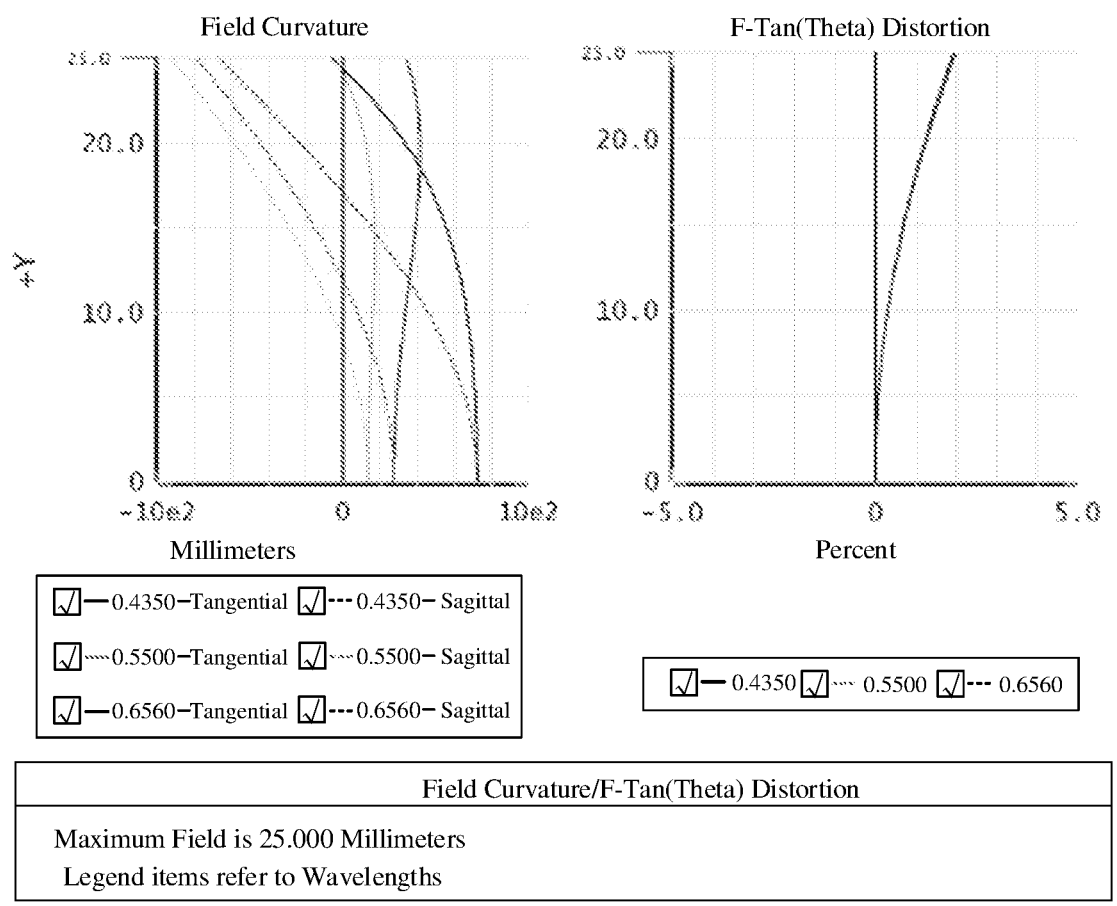
FIG. 6 is a curve chart of a field curvature/distortion under a medium-long focal length of a zoom lens, as disclosed by an embodiment of the present invention.
Figure 7:
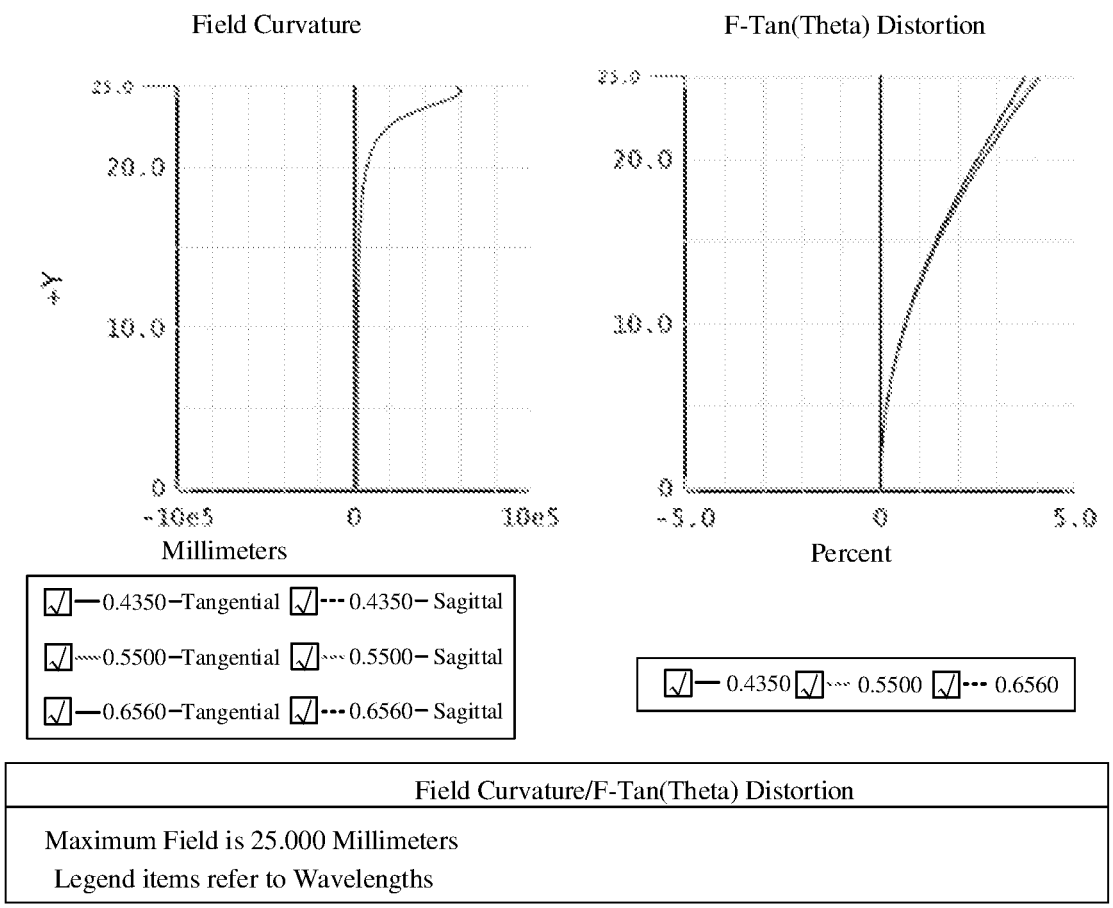
FIG. 7 is a curve chart of a field curvature/distortion under the shortest focal length of a zoom lens, as disclosed by an embodiment of the present invention.

Wherein, field curvature/distortion curves of RGB three-color irradiation imaging of the zoom lens 1 described in the above-mentioned embodiment respectively under the longest focal length, the medium-long focal length and the shortest focal length can be respectively as shown in FIG. 5 to FIG. 7, solid lines are meridian lines, and dotted lines are arc loss lines. It can be seen from FIG. 5 that the distortion of RGB three-color irradiation imaging under the longest focal length is about 0.55%, it can be seen from FIG. 6 that the distortion of RGB three-color irradiation imaging under the medium-long focal length is about 1.85%, and it can be seen from FIG. 7 that the distortion of RGB three-color irradiation imaging under the shortest focal length is about 4%.

Figure 8:
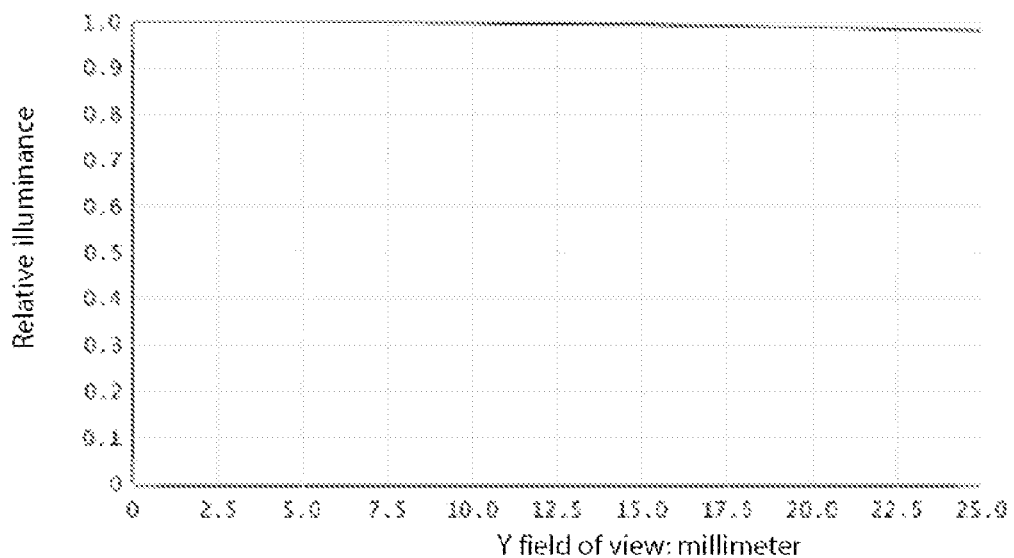
FIG. 8 is a schematic diagram of relative illuminance under the longest focal length of a zoom lens, as disclosed by an embodiment of the present invention.
Figure 9:
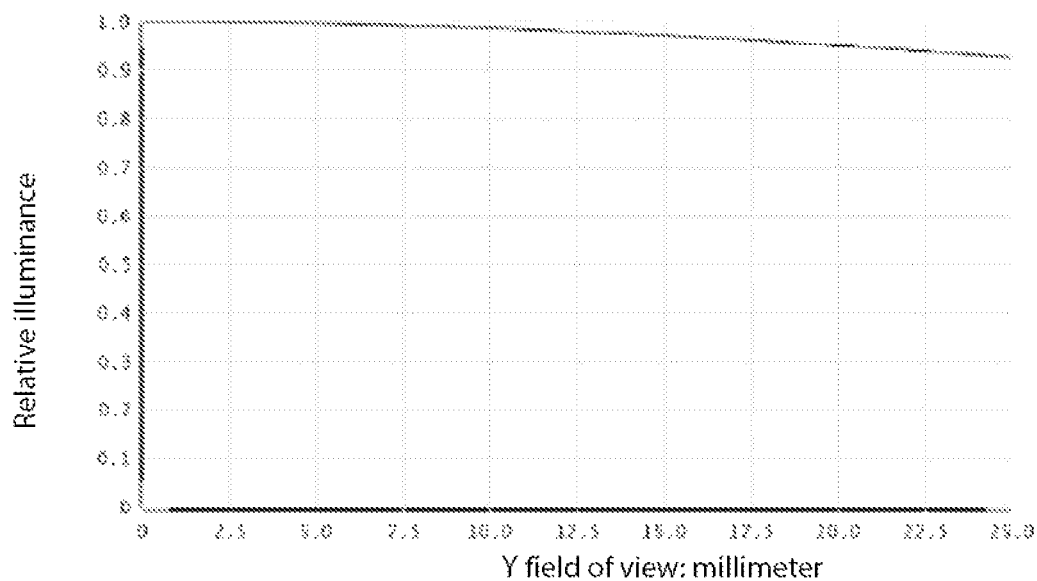
FIG. 9 is a schematic diagram of relative illuminance under a medium-long focal length of a zoom lens, as disclosed by an embodiment of the present invention.
Figure 10:
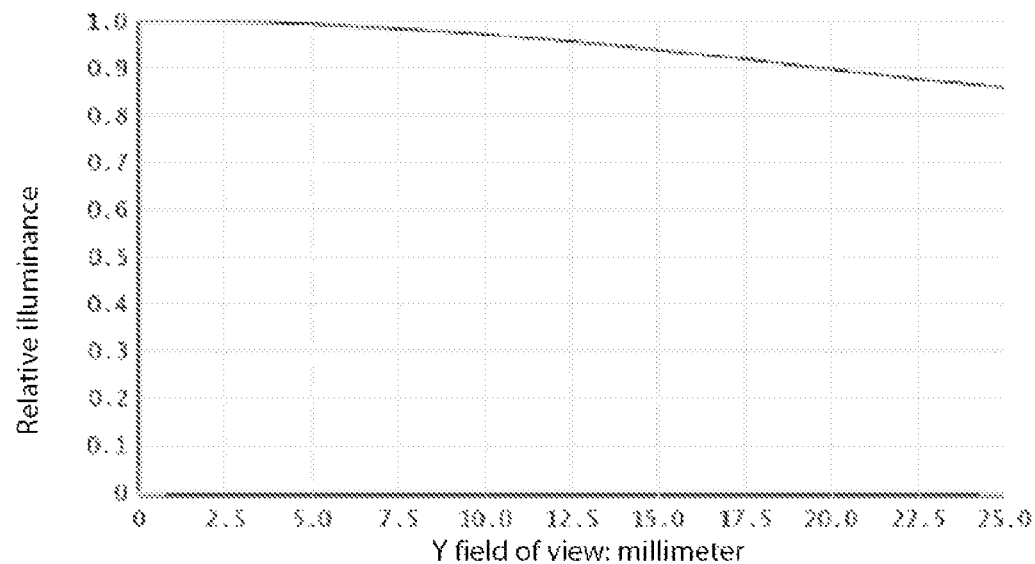
FIG. 10 is a schematic diagram of relative illuminance under the shortest focal length of a zoom lens, as disclosed by an embodiment of the present invention.

Wherein, the relative illuminance of the zoom lens 1 described in the above-mentioned embodiment respectively under the longest focal length, the medium-long focal length and the shortest focal length can be respectively as shown in FIG. 8 to FIG. 10. It can be seen from FIG. 8 that the relative illuminance under the longest focal length is about 98%, it can be seen from FIG. 9 that the relative illuminance under the medium-long focal length is about 92%, and it can be seen from FIG. 10 that the relative illuminance under the shortest focal length is about 86%.

It is thus clear that the zoom lens described in the embodiment of the present disclosure can be applied to a lighting lamp or a photographic camera shooting lamp and can realize a change of a pattern or a beam size in the photographic camera shooting and special effect lighting process, and the number of the lenses for forming the zoom lens is effectively reduced (i.e., not greater than 7) so as to benefit for improving convenience and efficiency of assembling the zoom lens; and zooming of the zoom lens can be realized only by movement of the zooming group and the compensating group, so that convenience and efficiency of zooming control of the zoom lens are improved, and the cost of the zoom lens can also be reduced, thereby reducing the cost of the lamp.

Embodiment III

Figure 13:
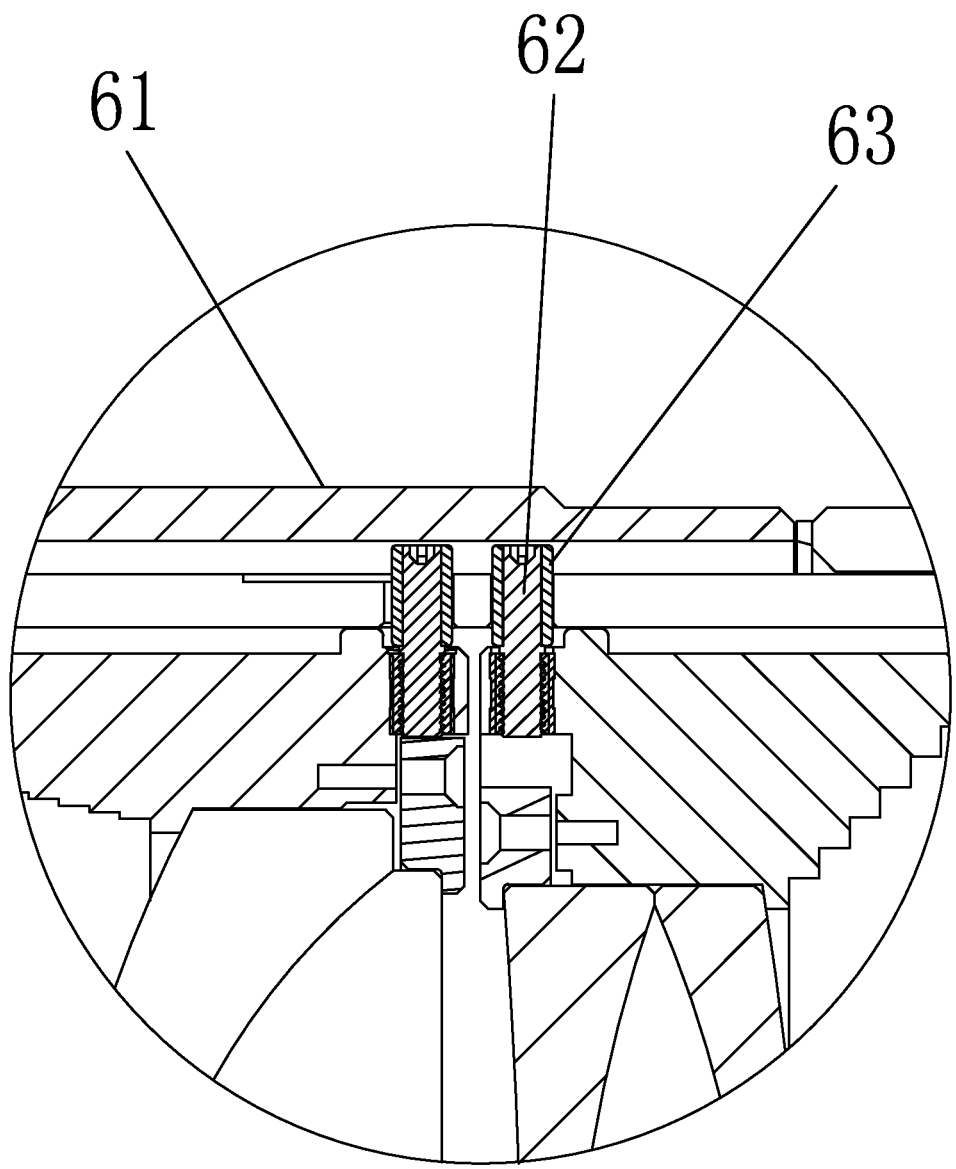
FIG. 13 is a structural schematic diagram of an optical focusing system disclosed by an embodiment of the present invention.

In order to meet more focusing demands, an embodiment of the present invention discloses an optical focusing system which can realize large-range zooming movement in an optical interval and achieve a rich light control function, provide a larger regulation range and make luminous efficiency higher and zooming regulation more flexible, wherein a structure of the optical focusing system can be as shown in FIG. 13, FIG. 13 is a structural schematic diagram of an optical focusing system disclosed by an embodiment of the present invention, and the optical focusing system shown in FIG. 13 is used for implementing zooming control on a zoom lens; optionally, the zoom lens can be the zoom lens 1 mentioned in Embodiment I and Embodiment II; and it should be noted that in order to display zooming control of the optical focusing system on the zoom lens better, besides specific parts included in the optical focusing system, FIG. 13 also shows position relationships and mounting relationships between the optical focusing system and partial parts of the zoom lens. Specifically, as shown in FIG. 13, the optical focusing system 6 comprises:

a focusing ring 61;

a focusing shifting lever 62, the focusing shifting lever 62 being used for being mounted on a lens of the zoom lens; and a shifting lever ring 63, the shifting lever ring 63 being assembled at the head of the focusing shifting lever 62, the shifting lever ring 63 being limited in an arc-shaped hole of a rear lens barrel of the zoom lens and an inner groove of the focusing ring 61, and specifically, the focusing shifting lever 62 and the shifting lever ring 63 passing through the arc-shaped hole of the rear lens barrel together and being embedded in the inner groove of the focusing ring 61.

Wherein, the focusing ring 61 rotates under the drive of an external force to drive the shifting lever ring 63 to do circumferential rolling; when the shifting lever ring 63 does circumferential rolling at the head of the focusing shifting lever 62, the focusing shifting lever 62 can be driven to slide and rotate in the arc-shaped hole of the rear lens barrel of the zoom lens so as to drive a zooming lens of the zoom lens to carry out movement rotation along a corresponding trajectory; and under the limitation of the arc-shaped hole of the rear lens barrel of the zoom lens, the focusing shifting lever 62 and the shifting lever ring 63 do the rolling sliding motion with a smooth lubricated matching surface in a gap of 0.05 mm.

Optionally, one or more focusing shifting levers 62 can be mounted on the zooming lens of the zoom lens. When a plurality of focusing shifting levers 62 are mounted, the plurality of focusing shifting levers 62 can be equally mounted at the circumference of the zooming lens of the zoom lens. In the actual application, the zooming lens of the zoom lens has a corresponding inner ring, and mounting the focusing shifting lever 62 on the zooming lens of the zoom lens specifically is that the focusing shifting lever 62 is mounted on the inner ring of the zooming lens of the zoom lens.

By taking a case that there are three focusing shifting levers 62 as an example, the focusing shifting levers 62 can be equally assembled on the corresponding inner ring of the zooming lens of the zoom lens at the circumference of the zooming lens of the zoom lens.

It is thus clear that the optical focusing system 6 described in the embodiment of the present invention can enable the lenses of the zoom lens to synchronously rotate while moving by cooperation of the focusing ring 61, the focusing shifting lever 62 and the shifting lever ring 63, realizes large-range zooming movement in an optical interval, achieves a rich light control function, provides a larger zooming regulation range and makes luminous efficiency higher and zooming regulation more flexible. In addition, circumferential rolling done by the shifting lever ring 63 is smoother than sliding friction movement, so that the zooming lens of the zoom lens moves in the rear lens barrel of the zoom lens more accurately and smoothly.

Embodiment IV

Figure 14:
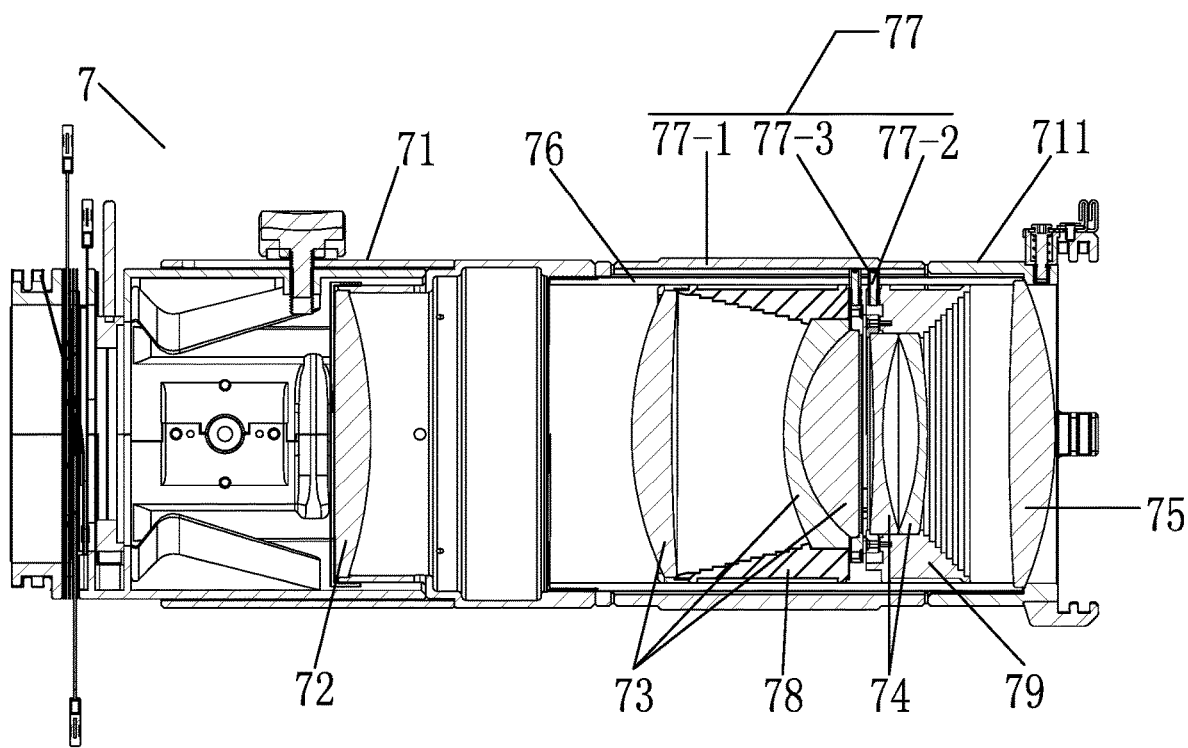
FIG. 14 is a sectional structural schematic diagram of a zoom lens with an optical focusing structure, as disclosed by an embodiment of the present invention.

With reference to FIG. 14, FIG. 14 is a sectional structural schematic diagram of a zoom lens with an optical focusing structure, as disclosed by an embodiment of the present invention. As shown in FIG. 14, the zoom lens 7 with the optical focusing structure comprises:

a front end light control barrel group 71, a first lens 72, a first zooming lens group 73, a second zooming lens group 74, a second lens 75, a rear lens barrel 76 and the optical focusing structure 77.

Wherein, the first lens 72 is arranged in the front end light control barrel group 71, the first zooming lens group 73 and the second zooming lens group 74 are arranged in the rear lens barrel 76, the second lens 75 is arranged at the tail of the rear lens barrel 76 in a light emergent direction, positions of the first lens 72 and the second lens 75 are relatively fixed and cannot be regulated, the first zooming lens group 73 and the second zooming lens group 74 are respectively provided with optical lenses, are smoothly and accurately matched with an inner surface of the rear lens barrel 76 in the rear lens barrel 76 and do smooth rotation movement under the action of lubricating grease, and the rear lens barrel 76 is provided with an arc-shaped hole 76-1, wherein a lens barrel structure formed by the front end light control barrel group 71 and the rear lens barrel 76 is equivalent to the second shell 3-2 included in the shell 3 in Embodiment I.

In the embodiment of the present invention, a specific structure of the optical focusing structure 77 can refer to the specific structure of the optical focusing system in Embodiment III, i.e., the optical focusing structure 77 comprises:

a focusing ring 77-1;

a focusing shifting lever 77-2, the focusing shifting lever 77-2 being mounted on the first zooming lens group 73 and the second zooming lens group 74; and a shifting lever ring 77-3, the shifting lever ring 77-3 being assembled at the head of the focusing shifting lever 77-2, the shifting lever ring 77-3 being limited in the arc-shaped hole 76-1 of the rear lens barrel 76 and an inner groove 77-1-1 of the focusing ring 77-1, and specifically, the focusing shifting lever 77-2 and the shifting lever ring 77-3 passing through the arc-shaped hole 76-1 of the rear lens barrel 76 together and being embedded in the inner groove 77-1-1 of the focusing ring 77-1.

Figure 16:
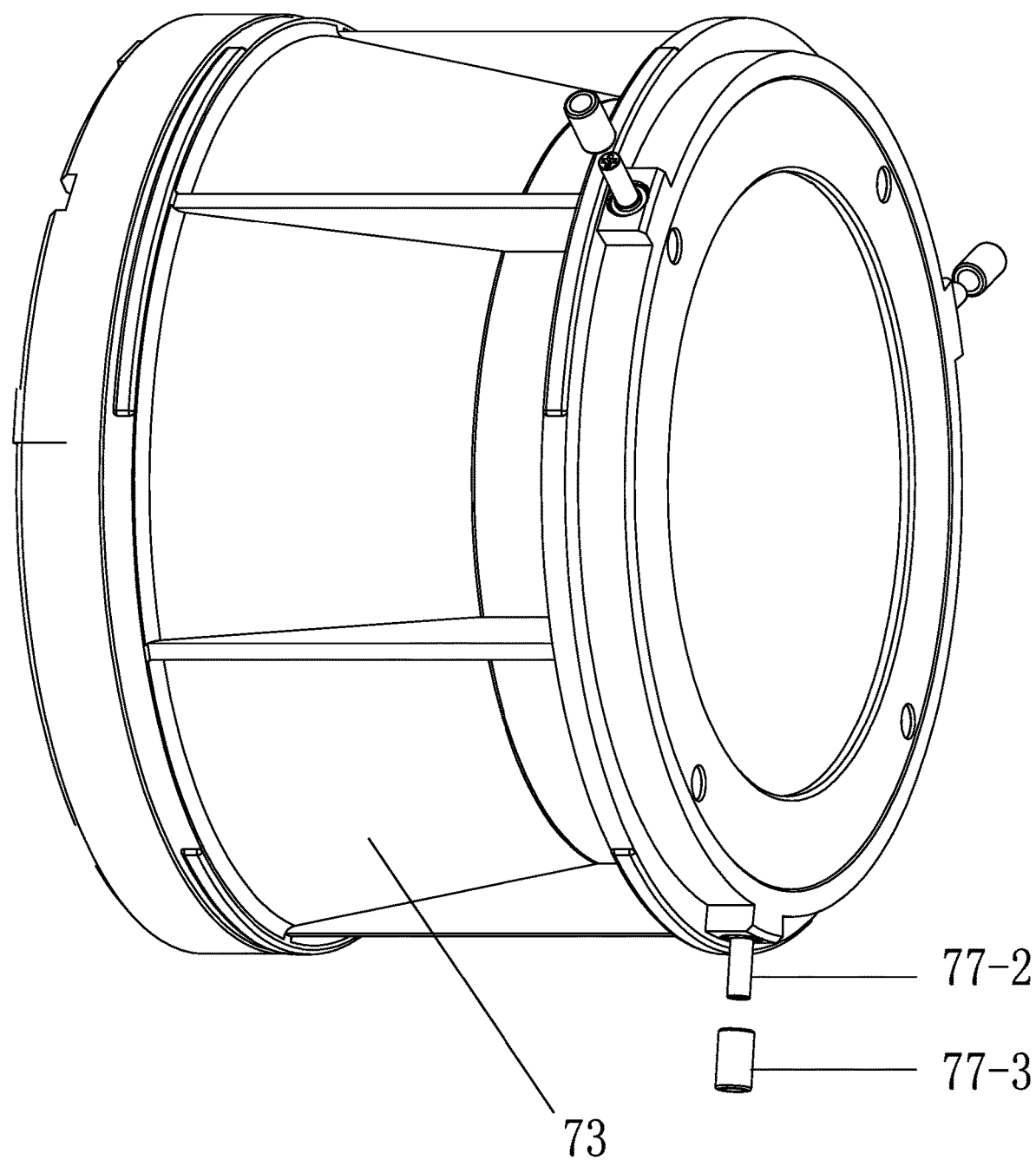
FIG. 16 is a partial three-dimensional structural schematic diagram of a zoom lens with an optical focusing structure, as disclosed by an embodiment of the present invention.

Wherein, a focusing implementation principle of the optical focusing structure 77 can refer to related descriptions in Embodiment III, and the embodiment of the present invention will not repeat. Moreover, by taking the first zooming lens group 73 as an example, partial structures of the focusing shifting lever 77-2, the shifting lever ring 77-3 and the first zooming lens group 73 can be as shown in FIG. 16, and FIG. 16 is a partial three-dimensional structural schematic diagram of a zoom lens with an optical focusing structure, as disclosed by an embodiment of the present invention.

Figure 17:
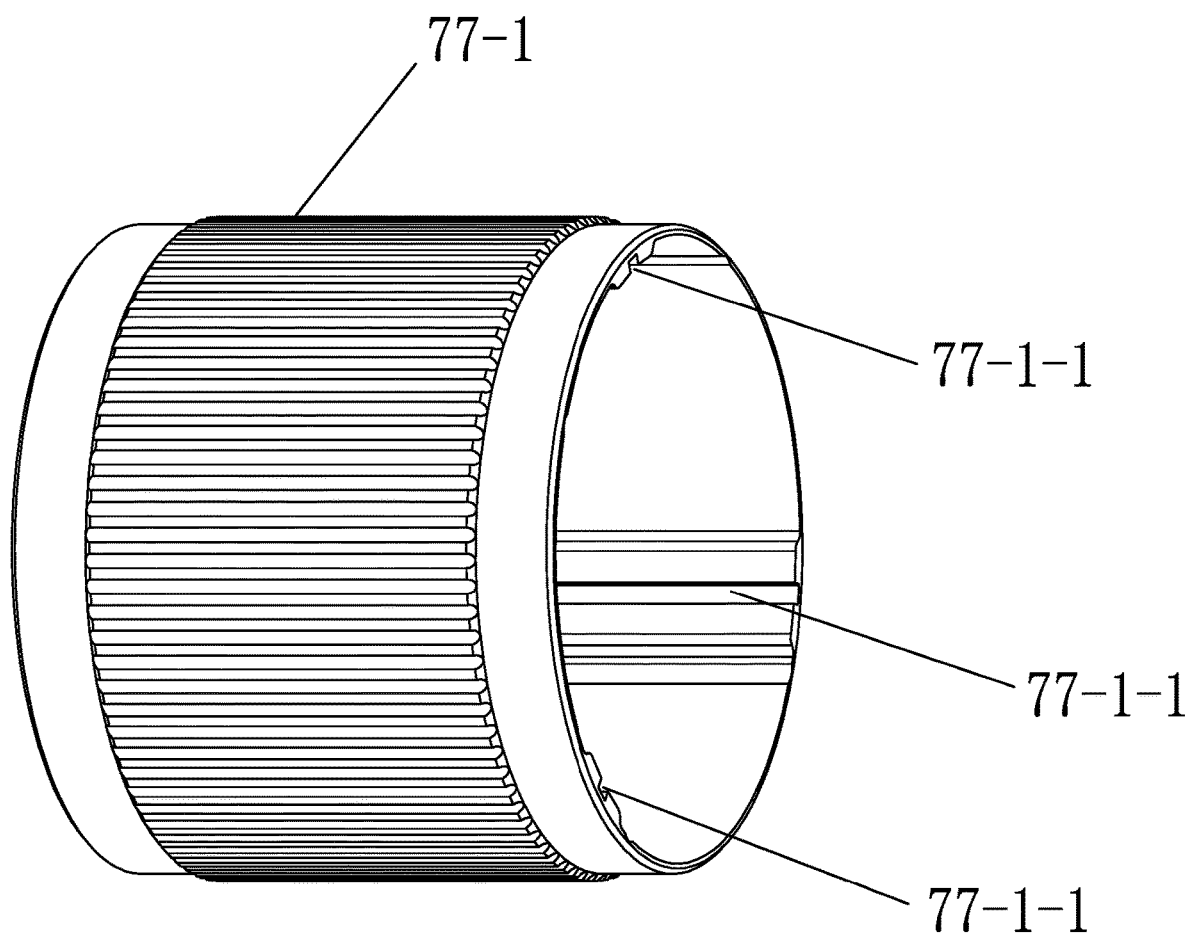
FIG. 17 is a three-dimensional structural schematic diagram of a focusing ring, as disclosed by an embodiment of the present invention.

In the embodiment of the present invention, a structure of the focusing ring 77-1 can refer to FIG. 17, and FIG. 17 is a structural schematic diagram of a focusing ring, as disclosed by an embodiment of the present invention.

Figure 18:
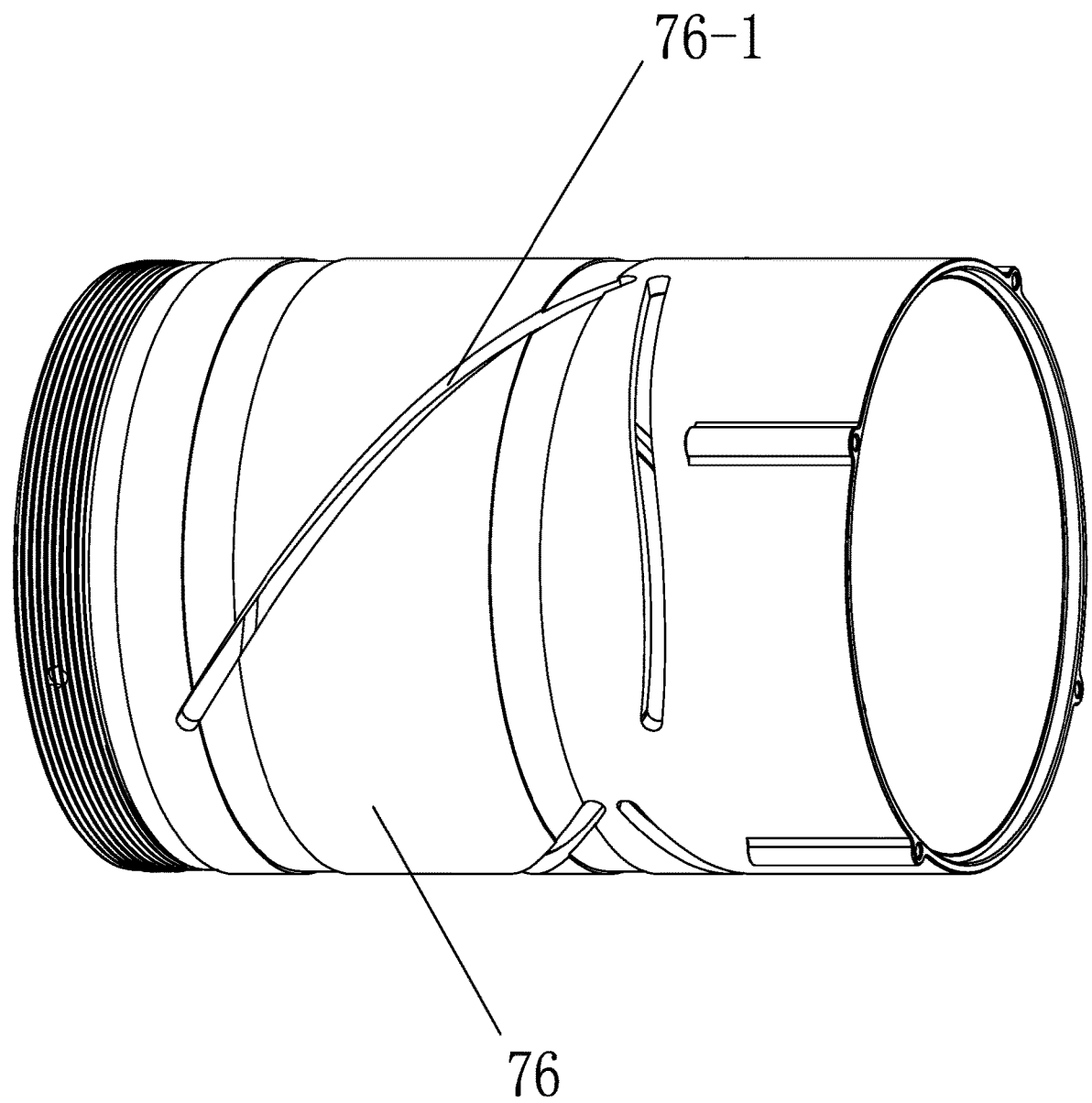
FIG. 18 is a three-dimensional structural schematic diagram of a rear lens barrel, as disclosed by an embodiment of the present invention.

In the embodiment of the present invention, a structure of the rear lens barrel 76 can refer to FIG. 18, and FIG. 18 is a structural schematic diagram of a rear lens barrel, as disclosed by an embodiment of the present invention.

In one optional embodiment, the specific structure of the first lens 72 can refer to the structure of the rear fixed group 11 included in the zoom lens 1 in Embodiment I or Embodiment II; a specific structure of the first zooming lens group 73 can refer to the structure of the zooming group 12 included in the zoom lens 1 in Embodiment I or Embodiment II; a specific structure of the second zooming lens group 74 can refer to the structure of the compensating group 13 included in the zoom lens 1 in Embodiment I or Embodiment II; and a specific structure of the second lens 75 can refer to the specific structure of the front fixed group 14 included in the zoom lens 1 in Embodiment I or Embodiment II, and the embodiment of the present invention will not repeat.

Optionally, as shown in FIG. 14, the zoom lens 7 with the optical focusing structure further comprises:

a first inner ring 78 corresponding to the first zooming lens group 73, and a second inner ring 79 corresponding to the second zooming lens group 74.

Wherein, the focusing shifting lever 77-2 is specifically mounted on the first inner ring 78 corresponding to the first zooming lens group 73 and the second inner ring 79 corresponding to the second zooming lens group 74.

Further optionally, a plurality of focusing shifting levers 77-2 can be equally mounted on the first inner ring 78 corresponding to the first zooming lens group 73 and the second inner ring 79 corresponding to the second zooming lens group 74 circumferentially. It should be noted that the number of the arc-shaped holes 76-1 of the rear lens barrel 76 can be greater than or equal to that of the assembled focusing shifting levers 77-2.

Figure 15:
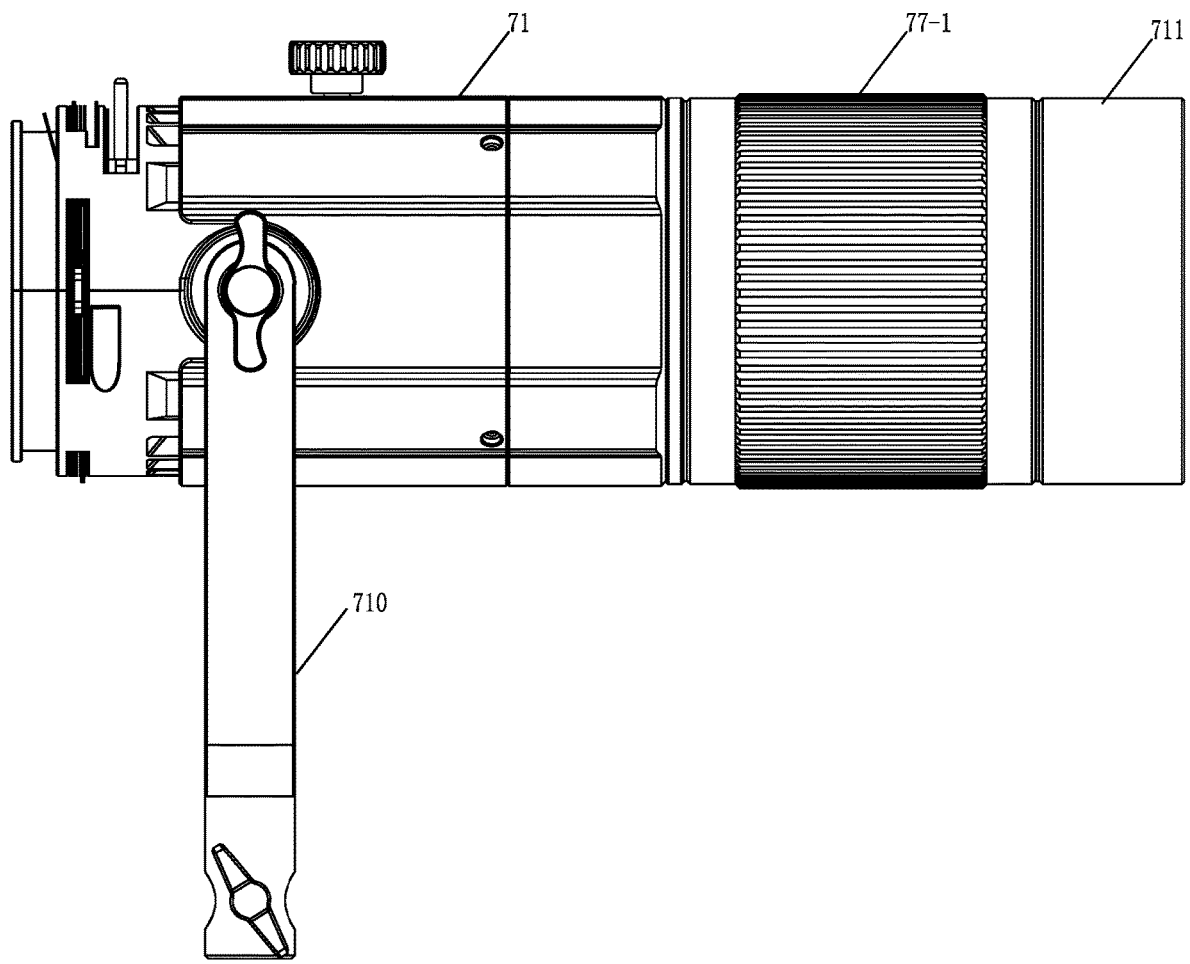
FIG. 15 is a front view of a zoom lens with an optical focusing structure, as disclosed by an embodiment of the present invention.

Furthermore optionally, the zoom lens 7 with the optical focusing structure further comprises:

a supporting structure 710, and/or, a pressing ring 711, wherein the pressing ring 711 is arranged at the end portion of the rear lens barrel in the light emergent direction, the supporting structure 710 is mounted outside the front end light control barrel group 71, and the mounted supporting structure 710 (such as a bracket) can be combined with an external mounting frame so as to facilitate arranging of the zoom lens 7 with the optical focusing structure at a needed position, is convenient to mount, improves the general applicability of the zoom lens 7 with the optical focusing structure and can also take a supporting effect on the zoom lens 7. It should be noted that the supporting structure 710 is not shown in FIG. 14, and can refer to a front view in FIG. 15; FIG. 15 is a front view of a zoom lens with an optical focusing structure, as disclosed by an embodiment of the present invention; and other descriptions related to the supporting structure 710 can refer to the detailed descriptions on the second supporting structure 5-2 in Embodiment I, and the embodiment of the present invention will not repeat.

Optionally, dimming attachment structures such as a shutter, a gobo, a diaphragm and the like are also mounted on the front side of the initial end portion of the front end light control barrel group 71 in the light emergent direction, so as to greatly enrich light control modeling.

It is thus clear that the zoom lens 7 with the optical focusing structure, as described by the embodiment of the present invention, can realize synchronous rotation of the zooming lens group of the zoom lens while moving, realizes large-range zooming movement in an optical interval, achieves a rich light control function, provides a larger zooming regulation range and makes luminous efficiency higher and zooming regulation more flexible. In addition, circumferential rolling done by the shifting lever ring 77-3 is smoother than sliding friction movement, so that the zooming lens group of the zoom lens moves in the rear lens barrel 76 more accurately and smoothly.

The device embodiments described above are merely schematic, wherein the modules illustrated as separate parts can be or can be not physically separated, the parts as module display can be or can be not physical modules, i.e., can be positioned at one position, or can be distributed on a plurality of network modules. Part or all of the modules can be selected according to actual demands to fulfill the aim of the solutions of the embodiments. Those ordinary skilled in the art can understand and perform implementation without paying any creative labor.

Finally, it should be noted that the above content disclosed by the lamp with the zoom lens and the zoom lens, as disclosed in the embodiments of the present invention, is merely preferable embodiments of the present invention, merely used for illustrating the technical solutions of the present invention, but not intended to limit it; although the present invention has been illustrated in detail with reference to the above-mentioned embodiments, those ordinary skilled in the art should understand that modifications can still be made to the technical solutions recorded in each above-mentioned embodiment, or equivalent replacements can be made to part of technical features; and those modifications and replacements shall make the essence of the corresponding technical solution fall within the spirit and scope of the technical solution of each embodiment of the present invention.

What is claimed is:

1. A lamp with a zoom lens, comprising the zoom lens and a lamp body, the lamp body being connected with the zoom lens, and the zoom lens comprising:
   a rear fixed group, the rear fixed group comprising a first biconvex lens;
   a zooming group, the zooming group comprising a first concave-convex meniscus lens and a plano-convex lens;
   a compensating group, the compensating group comprising a biconcave meniscus lens and a second concave-convex meniscus lens; and
   a front fixed group, the front fixed group comprising a second biconvex lens, wherein the rear fixed group, the zooming group, the compensating group and the front fixed group are sequentially arranged in a direction of an optical axis from a light source surface to a projection surface; and
   the lamp realizes zooming by movement of the zooming group and the compensating group comprised in the zoom lens in the direction of the optical axis; wherein the zooming group further comprises a third concave-convex meniscus lens, and the third concave-convex meniscus lens is positioned between the first biconvex lens and the first concave-convex meniscus lens;
   and wherein the rear fixed group, the zooming group, the compensating group and the front fixed group are coaxial with the lamp body.

2. The lamp with a zoom lens according to claim 1, wherein the first concave-convex meniscus lens is glued or attached to the plano-convex lens.

3. The lamp with a zoom lens according to claim 1, wherein focal lengths of the rear fixed group, the zooming group, the compensating group and the front fixed group are a positive focal length, a positive focal length, a negative focal length and a positive focal length, respectively.

4. The lamp with a zoom lens according to claim 1, wherein a distance range of the rear fixed group and the zooming group on the optical axis is 26 to 90 mm, a distance range of the zooming group and the compensating group on the optical axis is 4.6 to 83 mm, and a distance range of the compensating group and the front fixed group on the optical axis is 2.8 to 15 mm.

5. The lamp with a zoom lens according to claim 1, wherein a total mechanism length of the zoom lens is L, and a value range of L is that: L is smaller than $4f$ and greater than $3f$;
   a focal length of the rear fixed group is $f_1$, and a value range of $f_1$ is that: $f_1$ is smaller than $2.5f$ and greater than $1.5f$;
   a focal length of the zooming group is $f_2$, and a value range of $f_2$ is that: $f_2$ is smaller than $2f$ and greater than $f$;
   a focal length of the compensating group is $f_3$, and a value range of $f_3$ is that: $f_3$ is smaller than $-0.5f$ and greater than $-f$; and
   a focal length of the front fixed group is $f_4$, and a value range of $f_4$ is that: $f_4$ is smaller than $2f$ and greater than $f$,
   wherein f is a short-focus focal length of the zoom lens.

6. The lamp with a zoom lens according to claim 1, wherein a focal length of the biconcave meniscus lens is $f_{31}$, and a value range of $f_{31}$ is that: $f_{31}$ is smaller than $-1.1f$ and greater than $-1.3f$;
   a focal length of the second concave-convex meniscus lens is $f_{32}$, a value range of $f_{32}$ is that: $f_{32}$ is smaller than $-2.3f$ and greater than $-2.5f$, and a concave surface of the second concave-convex meniscus lens faces a pattern or the light source surface; and
   the biconcave meniscus lens or the second concave-convex meniscus lens is made of a negative lens material, a refractive index nd of the negative lens material is smaller than 1.65, and a dispersion coefficient vd of the negative lens material is greater than 50,
   wherein f is a short-focus focal length of the zoom lens.

7. The lamp with a zoom lens according to claim 1, wherein a refractive index nd of a lens material of the second biconvex lens is greater than 1.7, and a dispersion coefficient vd of the second biconvex lens is smaller than 30.

8. The lamp with a zoom lens according to claim 1, further comprising a shell (3) and a dimming attachment structure, the dimming attachment structure being arranged between the lamp body and the zoom lens, and the lamp body comprising: a light source, a first collimating lens and a second collimating lens,
   wherein the light source, the first collimating lens, the second collimating lens, the dimming attachment structure and the zoom lens are sequentially arranged in the shell (3) in a light emergent direction of the lamp.

9. The lamp with a zoom lens according to claim 8, wherein the first collimating lens moves along with the light source, and the second collimating lens is a fixed lens;
   the lamp carries out focusing by front-and-back movement of the first collimating lens; the lamp regulates front-and-back movement of the zooming group and the compensating group by rotating a lens barrel corresponding to the zoom lens so as to regulate a size of a light spot; and the lamp regulates blur and definition of a projection light spot by overall front-and-back movement of the zoom lens.

10. The lamp with a zoom lens according to claim 8, wherein lens parameters of the first collimating lens and/or the second collimating lens are set according to a size of a light-emitting surface of the light source;
    the lens parameters comprise one or a combination of two or more of a movement stroke, a minimum distance between the lenses, a diameter, a thickness, an arc surface diameter, an edge thickness, a convex surface texture type, a plane texture type, a surface roughness of a convex surface, a surface roughness of a plane, a refractive index, an effective focal length and a material.

11. The lamp with a zoom lens according to claim 10, wherein a distance range of the first collimating lens and the second collimating lens on the optical axis is 2.5 to 37.5 mm, and a distance range of the second collimating lens and the rear fixed group on the optical axis is 140 to 177.5 mm; and
    a convex surface, away from the light source, of the first collimating lens has an orange peel pattern, and a plane, facing the light source, of the second collimating lens has an orange peel pattern.

12. A zoom lens connected to a lamp body of a lamp, comprising:
    a rear fixed group, the rear fixed group comprising a first biconvex lens;
    a zooming group, the zooming group comprising a first concave-convex meniscus lens and a plano-convex lens;
    a compensating group, the compensating group comprising a biconcave meniscus lens and a second concave-convex meniscus lens; and a front fixed group, the front fixed group comprising a second biconvex lens, wherein the rear fixed group, the zooming group, the compensating group and the front fixed group are sequentially arranged in a direction of an optical axis from a light source surface to a projection surface; and the zoom lens realizes zooming by movement of the zooming group and the compensating group in a direction of the optical axis; wherein the zooming group further comprises a third concave-convex meniscus lens, and the third concave-convex meniscus lens is positioned between the first biconvex lens and the first concave-convex meniscus lens;

and wherein the rear fixed group, the zooming group, the compensating group and the front fixed group are coaxial with the lamp body.

* * * * *